US007398315B2

(12) United States Patent
Atkinson et al.

(10) Patent No.: US 7,398,315 B2
(45) Date of Patent: Jul. 8, 2008

(54) REDUCING UNWANTED AND UNSOLICITED ELECTRONIC MESSAGES BY PREVENTING CONNECTION HIJACKING AND DOMAIN SPOOFING

(75) Inventors: Robert George Atkinson, Woodinville, WA (US); Joshua T. Goodman, Redmond, WA (US); James M. Lyon, Redmond, WA (US); Roy Williams, Woodinville, WA (US); Khaja E. Ahmed, Bellevue, WA (US); Harry Simon Katz, Bellevue, WA (US); Robert L. Rounthwaite, Fall City, WA (US)

(73) Assignee: Workman Nydegger, Redmond, WA (US)

( * ) Notice: Subject to any disclaimer, the term of this patent is extended or adjusted under 35 U.S.C. 154(b) by 976 days.

(21) Appl. No.: 10/684,020

(22) Filed: Oct. 10, 2003

(65) Prior Publication Data

US 2004/0181571 A1 Sep. 16, 2004

Related U.S. Application Data

(60) Provisional application No. 60/454,517, filed on Mar. 12, 2003.

(51) Int. Cl.
*G06F 13/00* (2006.01)

(52) U.S. Cl. .................. 709/227; 709/206; 709/219

(58) Field of Classification Search .......... 709/206, 709/217, 219, 223, 225, 227, 237, 204, 224, 709/229
See application file for complete search history.

(56) References Cited

U.S. PATENT DOCUMENTS

| 6,195,698 | B1 * | 2/2001 | Lillibridge et al. ......... 709/225 |
| 6,199,102 | B1 | 3/2001 | Cobb ......................... 709/206 |
| 6,321,267 | B1 | 11/2001 | Donaldson ................. 709/229 |
| 6,546,416 | B1 * | 4/2003 | Kirsch ........................ 709/206 |
| 6,691,156 | B1 * | 2/2004 | Drummond et al. ......... 709/206 |
| 7,213,260 | B2 * | 5/2007 | Judge ........................... 726/3 |
| 7,249,175 | B1 * | 7/2007 | Donaldson ................. 709/225 |
| 2002/0083175 | A1 * | 6/2002 | Afek et al. .................. 709/225 |
| 2002/0198950 | A1 | 12/2002 | Leeds ......................... 709/206 |
| 2004/0148358 | A1 * | 7/2004 | Singh et al. ................. 709/207 |
| 2004/0181581 | A1 * | 9/2004 | Kosco ......................... 709/206 |

OTHER PUBLICATIONS

A DNS RR for simple SMTP sender authentication draft-danisch-dns-rr-smtp-02.txt Internet-Draft Hadmut Danisch, Jun. 2003 Category: Experimental Expires: Dec. 1, 2003.

(Continued)

*Primary Examiner*—Viet Vu

(57) ABSTRACT

The present invention provides for generating inputs that can be provided to a message classification module to facilitate more reliable classification of electronic messages, such as, for example, as unwanted and/or unsolicited. In one embodiment, a sending messaging server provides an appropriate response to address verification data thereby indicating a reduced likelihood of the sending messaging server using a forged network address. In another embodiment, it is determined if a messaging server is authorized to send electronic messages for a domain. In yet another embodiment, electronic message transmission policies adhered to by a domain are identified. In yet a further embodiment, a sending computer system expends computational resources to solve a computational puzzle and includes an answer document in an electronic message. A receiving computer system receives the electronic message and verifies the answer document.

48 Claims, 8 Drawing Sheets

OTHER PUBLICATIONS

A DNS RR for simple SMTP sender authentication draft-danisch-dns-rr-smtp-01.txt Internet-Draft Hadmut Danisch, Apr. 2003 Category: Experimental Expires: Oct. 15, 2003.

A DNS RR for simple SMTP sender authentication draft-danisch-dns-rr-smtp-00.txt Internet-Draft Hadmut Danisch, Dec. 2002 Category: Experimental Expires: Jun. 3, 2003.

Secure Has H Standard FIPS PUB 180-1 Supersedes FIPS PUB 180 May 11, 1993 Federal information Processing Standards Publication 180-1, Apr. 17, 1995.

Pricing via Processing or Combatting Junk Mail Cynthia Dwork, Moni Naor.

Hashcash—A Denial of Service Counter-Measure Adam Back, Aug. 1, 2002 pp. 1-10.

Klensin, J., "Simple Mail Transfer Protocol" Request for Comments: 2821, Category: Standards Track, Apr. 2001.

Vixie, Paul, "Repudiating Mail From" Request for Comments, Category: Experimental, Jun. 6, 2002.

"The Coordinated Spam Reduction Initiative" Online! Feb. 13, 2004, pp. 1-54, Retrieved from the Internet: URL:http://spf.pobox.com/caller-id/csrl.pdf.

"camram" Antispam Systems Using Proof of Work Postage Stamps and Digital Signatures, Online! Oct. 12, 2002, pp. 1-17, retrieved from the internet: URL:http://web.archive.org/>.

Shafranovich, Y., "Sender ID: A Tale of Open Standards and Corporate Greed?—Part 1 and II" Online! Sep. 1, 2004, pp. 1-7, retrieved from the internet: URL:www.circleid.com>.

Atkinson, B., "DNS record types; RE: [Asrg] Problems with RMX" Online! May 6, 2003, pp. 1-2; retrieved from the internet: URL:www1.ietf.org/mail-archive/web.asrg/current/msg04302.htm.

* cited by examiner

REDUCING UNWANTED AND UNSOLICITED ELECTRONIC MESSAGES BY PREVENTING CONNECTION HIJACKING AND DOMAIN SPOOFING

CROSS REFERENCE TO RELATED APPLICATIONS

The present application claims the benefit of U.S. Provisional Patent Application Ser. No. 60/454,517, filed Mar. 12, 2003, and entitled "Coordinated Reduction Of Unwanted And Unsolicited Electronic Mail Messages".

BACKGROUND OF THE INVENTION

1. The Field of the Invention

The present invention relates to electronic mail technology, and more specifically, to reducing unwanted and unsolicited electronic messages.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

Unwanted and unsolicited email (commonly referred to as "SPAM") has been around virtually as long as there has been electronic mail. Historically, the annoyance and burden of spam was (though noticeable) small enough so as to not be a significant problem. However more recently, the rate at which SPAM has been appearing in users' electronic mailboxes has significantly increased. It is not uncommon for large commercial electronic mailbox providers to routinely observe that well over half or even three quarters of the electronic mail received by their users is SPAM. The problem has become one of significant proportions, costing users, industry, and the economy at large significant time and financial resources, threatening perhaps to even undermine the viability of electronic mail as a useful communication medium.

Conventionally, the design of electronic mail client software and electronic mail server software has primarily focused on making the user experience of dealing with their electronic mail as efficient, useful, and pleasant as possible. The software had little, if any, understanding of the actual interest a user might have in a given electronic mail message. Thus, all received electronic mail messages tended to be treated as equals and similarly presented to the user regardless of the content of the electronic mail messages. Unfortunately, this treatment of electronic mail messages results in the presentation of SPAM being virtually indistinguishable from the presentation of legitimate electronic mail messages (e.g., electronic messages from known senders, responses to electronic messages sent from the user, etc.)

Accordingly, a number of techniques have been developed to classify electronic mail messages as SPAM and thereby distinguish SPAM from other legitimate electronic mail messages. Some techniques examine received electronic mail messages and classify a received electronic mail message as SPAM based upon words or phrases found therein. Other techniques for classifying SPAM take advantage of the fact that electronic mail messages that are SPAM are typically sent to a large number of users. These other techniques use collective voting approaches to identify electronic mail messages as SPAM. Another common and particularly useful technique is the maintenance, on a user's behalf, of a list of his known correspondents, an approach commonly called a 'known-sender list' or "white list".

After classification as SPAM, a SPAM electronic mail message may be treated differently than legitimate electronic mail messages, such as, for example, by automatically moving the SPAM electronic mail message into a user's "SPAM Folder" or possibly even deleting the SPAM electronic mail message without a user ever knowing it was sent.

However, many conventional electronic mail classification techniques rely solely on the contents of an electronic mail message (e.g., the headers and/or body of the electronic mail message) when determining whether the electronic mail message is legitimate or is SPAM. This is problematic, since entities desiring to send SPAM can (often quite easily) intentional alter a SPAM electronic mail message to appear as a legitimate electronic mail message. For example, an entity desiring to send SPAM may configure the body of an electronic mail message such that the chances of detection by an electronic mail filter are reduced. Further, an entity desiring to send SPAM may alter certain addressing information in the header portion of an electronic mail message, commonly referred to as "domain spoofing."

Spoofing a domain name includes changing the domain name of the sender's electronic mail address (i.e., the text after the "@" in the electronic mail address) to make it appear as if an electronic mail message was sent from a particular entity, when the particular entity did not in fact send the electronic mail message. Thus, electronic mail classification techniques may incorrectly classify an electronic mail message as legitimate based on the spoofed domain name, when in fact the electronic mail message should be classified as spam. Accordingly, the effectiveness of conventional mail classification techniques is reduced.

Typically, before an electronic mail message is transferred from a sending mail server to a receiving mail server, a connection, such as, for example, a Transmission Control Protocol ("TCP") connection, is established between the sending and receiving mail servers. Connection establishment can include the exchange of configuration information including network addresses, port numbers, and sequence numbers. For example, TCP connection establishment includes a well known three-way handshake sequence. Unfortunately, since the TCP three-way handshake sequence is well known, an entity desiring to send SPAM could forge a network address and then send configuration information (e.g., sequence numbers) purported to have originated from the forged network address. A receiving mail server may incorrectly determine that the configuration information originated from the forged network address.

Thus, the entity could forge a network address and establish a connection that appears to the receiving mail server to have originated from the forged network address. Accordingly, the entity could then use the established connection to send electronic mail messages that appear to have originated from the forged network address. If the entity then also spoofs the domain name of the forged network address, it may be difficult, if not impossible, to determine the true originating network address of an electronic mail message. Based on the forged network address and spoofed domain name, a receiving mail server may incorrectly classify the electronic mail message as legitimate. Therefore, mechanisms for coordinated reduction of unwanted and unsolicited electronic messages would be advantageous.

BRIEF SUMMARY OF THE INVENTION

The foregoing problems with the prior state of the art are overcome by the principles of the present invention, which are directed towards methods, systems, computer program products, and data structures for reduction of unwanted and unsolicited electronic messages. Depending on desired functionality, one or more of a plurality of different generated inputs can be provided, potentially along with message data contained in an electronic message, to a message classification module. Based on received inputs, the message classification module can classify an electronic message as legitimate or as unwanted and/or unsolicited. When a plurality of inputs (each input representing different information associated with the transmission of an electronic message) are utilized, a message classification module can more reliably classify electronic messages, such as, for example, more reliably classifying an electronic message as unwanted and/or unsolicited.

In one embodiment, a standardized exchange of connection establishment data is altered to reduce the likelihood of an entity sending electronic messages from a forged network address (e.g., a forged Internet Protocol ("IP") address). A sending side computer system sends connection initiation data (e.g., port, sequence number, etc.) including a purported sending network address. A receiving side computer system receives the connection initiation data including the purported sending address. The receiving side computer system alters standard connection establishment data to include address validation data. The receiving computer sends the altered connection establishment data to the purported sending network address.

When the purported sending network address corresponds to the sending computer system, the sending computer system may receive the altered connection establishment data including the address validation data. Accordingly, the sending side computer system can generate an appropriate connection response data based on the address validation data. On the other hand, when the purported sending network address does not correspond to the sending computer system (e.g., when the network address is forged) the sending computer system does not receive the altered connection establishment data including the address validation data.

It may be that the sending side computer system sends standard connection response data to the receiving computer system (e.g., in an attempt to simulate standard connection response data from a computer system that does correspond to the purported sending address). However, since the sending side computer system is not aware of the address validation data, the sending computer system can not appropriately respond to the address validation data. The receiving side computer system determines if a computer system corresponding to the purported sending network address appropriately responded to the address validation data.

In another embodiment, a name services (e.g., Domain Name Services) entry for a domain (e.g., "test.com") is configured to contain network addresses (e.g., IP addresses) for computer systems that are authorized to handle outgoing messages for the domain. That is, a name server entry is configured with the network addresses of computer systems that are authorized to transmit electronic messages for the domain. A receiving messaging server receives an electronic message purportedly sent from a sending side domain. The receiving messaging server identifies an actual sending side network address corresponding to a sending messaging server that sent the electronic message (e.g., from connection establishment data).

The receiving messaging server queries a name server for a list of network addresses authorized to send electronic messages for the sending domain. The receiving messaging server determines if the actual sending side network address is contained in the list of authorized network addresses. The receiving messaging server provides results of the determination (i.e., a sending computer system being authorized or unauthorized to send electronic messages for a domain) to a message classification module.

In yet another embodiment, Electronic Message Transmission Policies ("ETPs") are contained in a name services entry for a domain or are included in received electronic messages. ETP certificates can be used to indicate to a receiving computer system the ETPs adhered to by a sending domain. A receiving messaging server receives an electronic message from a sending domain. The receiving messaging server receives one or more ETPs (e.g., included in an ETP certificate) corresponding to the sending domain. The receiving message server can receive ETPs, for example, by querying a name server or extracting ETPs from the received electronic message.

The receiving messaging server parses relevant ETPs The relevant ETPs are indicative of the ETPs adhered to by the sending domain. The receiving messaging server provides the relevant ETPs to a message classification module.

In yet a further embodiment, a sending computer system demonstrates to a receiving computer system that computational resources were expended before sending an electronic message. Expended computational resources can at least be estimated by the receiving computer system, when the sending computer system provides an appropriate solution to a computational puzzle. Computational puzzles can be configured such that the sending computer system is required to expend increased computation resources to generate an appropriate solution (e.g., solutions identified using a brute force approach). However, significantly reduced computational resources are expended at a receiving computer system to verify an appropriate solution. Computation of a verifiable solution essentially results in the electronic message sender purchasing (through expended processor cycles) a ticket to send an electronic message to the electronic message receiver. One such computational puzzle implements brute force calculation of an answer document.

A sending messaging server receives electronic message data that is to be contained in an electronic message. The sending messaging server generates an initial document, for example, from different portions of the electronic message data and/or other state information. A puzzle input is generated from one or more components of the electronic message. The puzzle input is provided to a puzzle hash algorithm specifically designed for use in deterring unwanted and/or unsolicited electronic messages. For example, a puzzle hash algorithm can utilize hashing sub-functions of the SHA-1 algorithm but apply the sub-functions in an order that differs from the SHA-1 algorithm. Applying sub-functions in a different order makes the puzzle hash algorithm more difficult to implement in hardware and differentiates its use from the problem space where hardware acceleration of a hash algorithm is desired for legitimate needs.

In some embodiments, the puzzle input is the initial document. In other embodiments, the puzzle input is calculated from the initial document and other mail message data.

The sending messaging server identifies an answer document such that an answer hash value, calculated (using the puzzle hash algorithm) from a combination of the answer document and the puzzle input (either the initial document or a puzzle input hash value), is answer value for a computational puzzle. For example, an answer document may be used to calculate an answer hash value having a specified number of leading zeros. The sending message in server sends an electronic message including the message data and the answer document to a receiving domain.

A receiving computer system in the receiving domain receives the electronic message. The receiving computer system reproduces the initial document, for example, from the different portions of the message data and/or other state information, used at the sending computer system. The receiving computer system recalculates the puzzle input from the initial document (potentially using the puzzle hash algorithm to calculate the puzzle input hash value). The receiving computer system determines if a verifying hash value, calculated (using the puzzle hash algorithm) from a combination of the answer document and the puzzle input (either the initial document or a puzzle input hash value), is an answer indicative of a solution to the computational puzzle (e.g., does the verifying hash value have the specified number of leading zeros). The receiving computer system provides the results of the determination (e.g., whether the sending messaging server provided a verifiable or unverifiable solution or provided no solution at all) to a message classification module.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
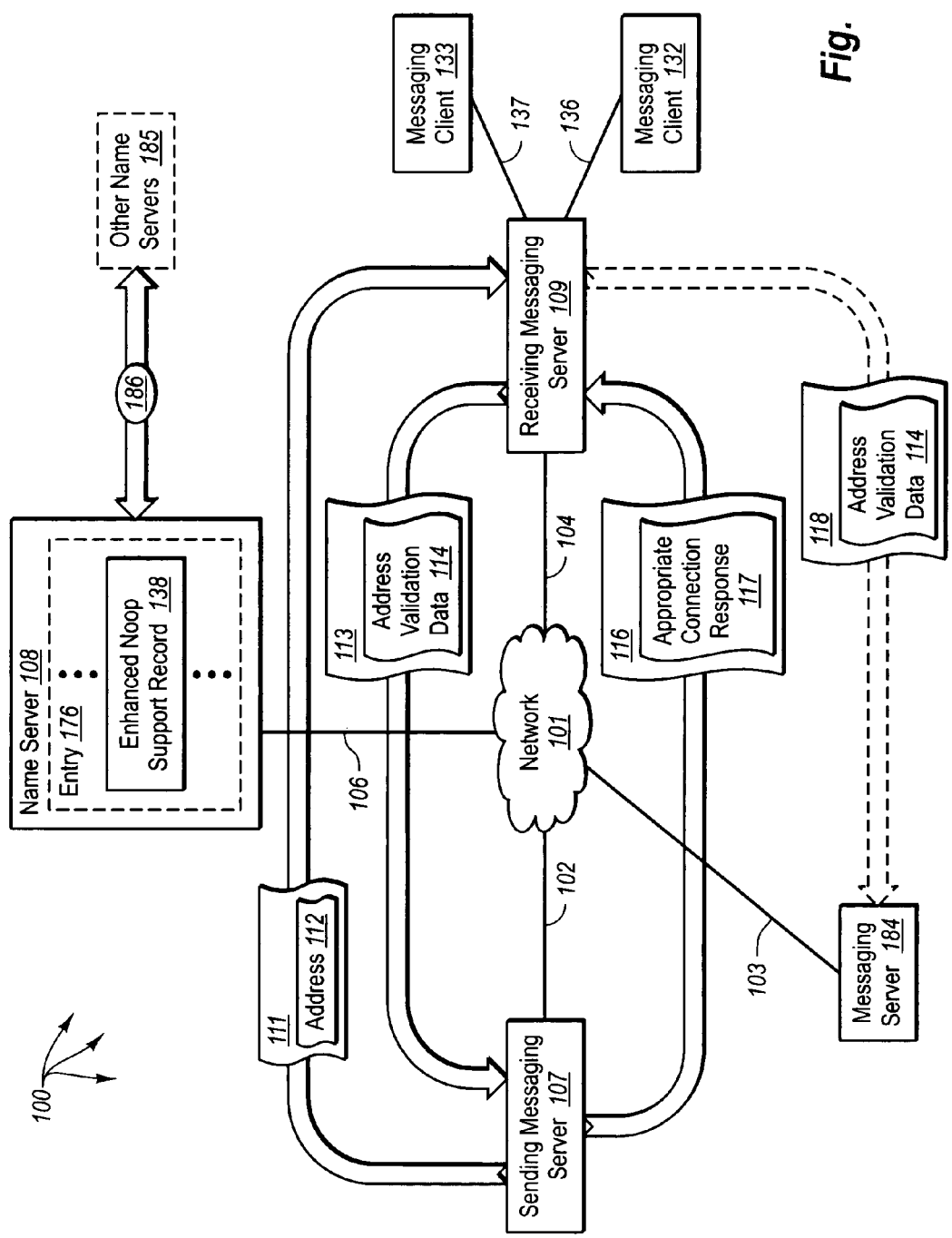
FIG. 1 illustrates an example of a network architecture that facilitates reducing connection hijacking in accordance with the principles of the present invention.

The principles of the present invention are directed towards methods, systems, computer program products, and data structures for coordinated reduction of unwanted and unsolicited electronic messages. The exchange of connection establishment data is altered to reduce the risk of, and potentially prevent, an entity from sending electronic messages that include a forged network address. Receiving messaging servers check authorized outgoing server lists to identify servers that are authorized to send electronic messages for a domain. Receiving messaging servers identify electronic message transmission policies for a domain. Sending messaging servers calculate and receiving messaging servers verify answers to computation puzzles. The results of outgoing server list checks, identified electronic message transmission policies, and puzzle answer verification can be provided along with other inputs to an electronic message classification module.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 illustrates an example of a network architecture 100 that facilitates reducing connection hijacking in accordance with the principles of the present invention. Within network architecture 100, sending messaging server 107, receiving messaging server 109, and messaging server 184 are connected to network 101 by corresponding links 102, 104, and 103 respectively. Similarly, name server 108 is connected to network 101 by link 106. Links 102, 103, 104 and 106 as well as network 101 can include a portion of a system bus, a portion of a local area network ("LAN"), a portion of a Wide Area Network ("WAN") and/or even a portion of the Internet. As illustrated by bi-directional arrow 186, name server 108 can also communicate with other name servers 185 for purposes of recursive queries. Similarly, computer systems in network architecture 100 can query other name servers 185 directly for purposes of iterative queries (although links connecting computer systems in network architecture 100 to other name servers 185 are not expressly depicted).

Messaging clients 132 and 133 are connected to receiving messaging server 109 by corresponding links 136 and 137 respectively. Messaging entities (e.g., users or corporations) can utilize messaging clients 132 and 133 to access electronic messages stored at receiving messaging server 109.

Sending Messaging server 107, receiving messaging server 109 and messaging server 184 can be electronic messaging servers that utilize Transmission Control Protocol ("TCP") to establish connections between one another as well as with other computer systems. Sending messaging server 107, receiving messaging server 109 and messaging server 184 can also utilize Simple Mail Transfer Protocol ("SMTP") to exchange electronic mail messages (e.g., over an established TCP connection) with other messaging servers as well as with other computer systems. Name server 108 can be a Domain Name System ("DNS") server that translates domain names (e.g., www.test.com) into Internet Protocol ("IP") addresses (e.g., 112.45.123.99).

Name server 108 can store one or more records indicating that a domain supports the exchange of non-standard connection establishment data, such as, for example, support for enhanced NOOP commands or support for other SMTP extension commands. A record indicating support for exchange of non-standard connection establishment data can be a DNS record, such as, for example, a special NOOP record, a TXT record, or a set of TXT records. A TXT record or set of TXT records can contain text data or other data encoded in a textual form, such as, for example, eXtensible Markup Language ("XML") instructions. Records indicating support for exchange of non-standard connection establishment data can be included in a DNS record set that indicates the electronic mail policy for a domain.

Figure 2:
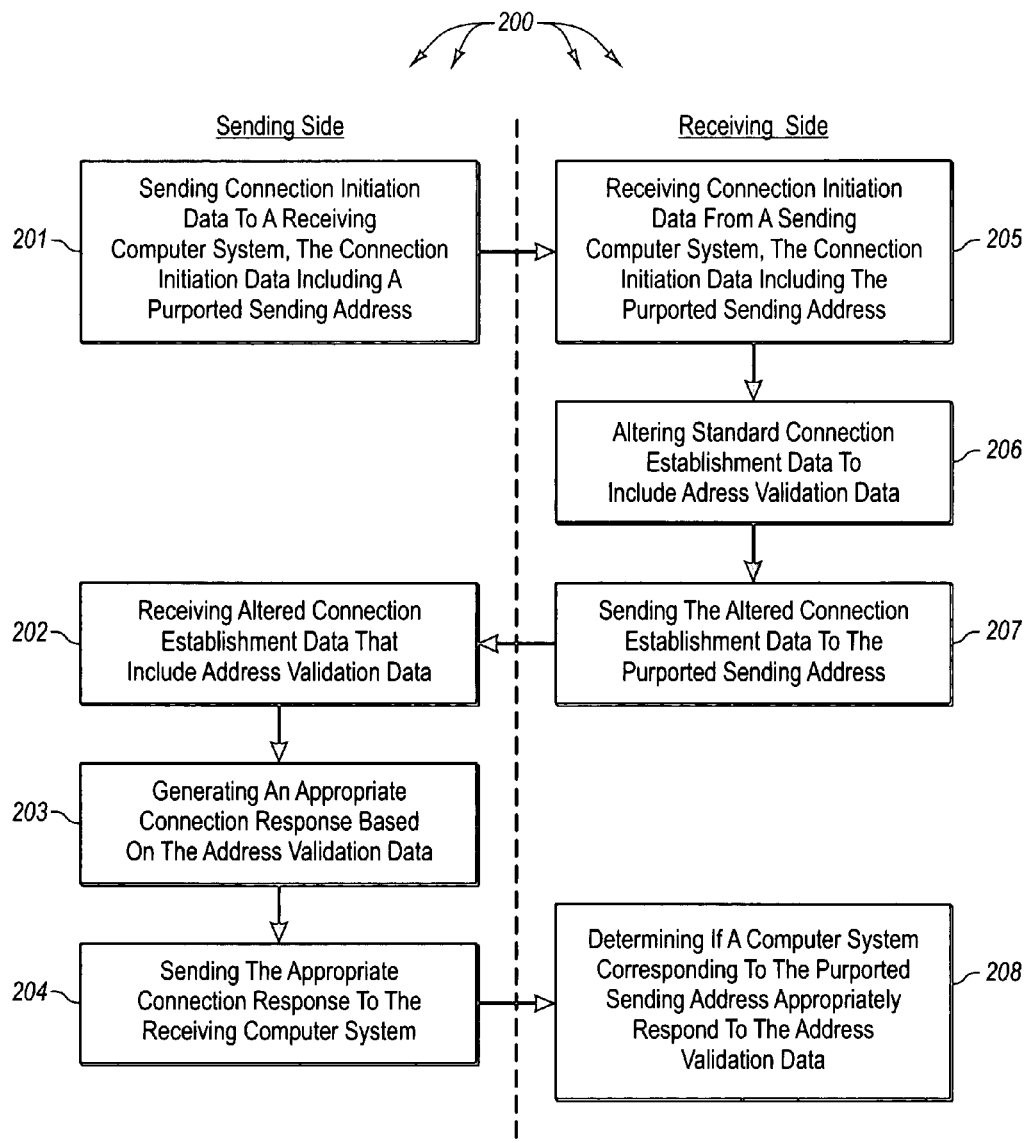
FIG. 2 illustrates an example flowchart of a method for reducing connection hijacking in accordance with the principles of the present invention.

FIG. 2 illustrates an example flowchart of a method 200 for reducing connection hijacking in accordance with the principles of the present invention. Method 200 will be described with respect to the components illustrated in network architecture 100. The method 200 includes an act of sending connection initiation data to a receiving computer system, the connection initiation data including a purported sending address (act 201). Act 201 can include a sending computer system sending connection initiation data to a receiving computer system. Connection initiation data can be data for initiating establishment of a connection, such as, for example, a TCP or SMTP connection, between the sending messaging server and another computer system. Accordingly, connection initiation data can also include a sequence number, a port number, or other appropriate command for initiating connection establishment.

For example, sending messaging server 107 can send connection initiation data 111, which includes address 112, to receiving messaging server 109. It may be that sending messaging server 107 is attempting to hijack a network address (e.g., an IP address) corresponding to messaging server 184. Thus, address 112 may be a network address that corresponds to messaging server 184. On the other hand, sending messaging server may not be attempting to hijack a network address and address 112 may be a network address that corresponds to sending messaging server 107. Connection initiation data 111 can be included, for example, in an SMTP HELO command or SMTP EHLO command that is sent from sending messaging server 107.

The method 200 includes an act of receiving connection initiation data from a sending computer system, the connection initiation data including the purported sending address (act 205). Act 205 can include a receiving computer system receiving connection initiation data from a sending computer system. Received connection initiation data can be data for initiating establishment of a connection, such as, for example, a TCP or SMTP connection, between the receiving messaging server and another computer system. For example, receiving messaging server 109 can receive connection initiation data 111, which includes address 112, from sending messaging server 107. Connection initiation data 111 can be included in an SMTP HELO command that is received at receiving messaging server 109.

The method 200 includes an act of altering standard connection establishment data to include address validation data (act 206). Act 206 can include the receiving computer system altering standard connection establishment data to include address validation data. For example, receiving messaging server 109 can alter standard connection establishment data that would otherwise be sent to address 112 in response to receiving connection initiation data 111. When connection initiation data 111 indicates a TCP connection is to be established, receiving messaging server 109 can break the standard connection response data into a plurality of network packets. Alternately, when connection initiation data 111 indicates a TCP connection is to be established, receiving messaging server 109 can drop connection initiation data 111. In some embodiments, in response to receiving connection establishment data 111, receiving messaging server 109 alters standard connection establishment data to include a random string of characters (or other portion of non-standard data).

Method 200 includes an act of sending the altered connection establishment data to the purported sending address (act 207). Act 207 can include a receiving computer system sending the altered connection establishment data to the purported sending address. For example, when address 112 corresponds to sending messaging server 107, receiving messaging server 109 can send altered connection establishment data 113, which includes address validation data 114, to sending messaging server 107. On other hand, when address 112 corresponds to messaging server 184, receiving messaging server 109 can send altered connection establishment data 118, which includes address validation data 114, to messaging server 184.

Altered connection establishment data 113 and 118 can be the last network packet in a sequence of packets including connection establishment data, a request to resend connection initiation data, or an SMTP HELO response or SMTP EHLO response command that includes a random string of characters (or other portion of non-standard data). These types of connection establishment data can vary from standard connection establishment data. Accordingly, there is a decreased likelihood that a computer system attempting to hijack a network address could correctly predict an appropriate response to the altered connection establishment data.

The method 200 includes an act of receiving altered connection establishment data that includes address validation data (act 202). Act 202 can include a sending computer system receiving altered connection establishment data that includes address validation data. For example, sending messaging server 107 can receive altered connection establishment data 113, which includes address validation data 114, from receiving messaging server 109.

In some embodiments, a messaging server that did not send connection initiation data receives altered connection establishment data. For example, when address 112 corresponds to messaging server 184, messaging server 184 can receive altered connection establishment data 118, which includes address validation data 114, from receiving messaging server 109. When received altered connection establishment data 118 was not received in response to corresponding connection initiation data, messaging server 184 may simply discard altered connection establishment data 118. Thus, when sending messaging server 107 is attempting to simulate (and thus hijack) a connection from messaging server 184, receiving messaging server 109 may not receive an appropriate response to address validation data 114. For example, receiving messaging server 109 may not receive an enhanced NOOP command echoing back a random sequence of characters contained in address validation data 114.

Accordingly, receiving messaging server 109 can query name server 108 to determine if messaging server 184 (a messaging server corresponding to address 112) supports altered connection establishment data. Entry 176 may be a DNS entry for a domain that includes messaging server 184. Receiving messaging server 109 can query entry 176 for an altered connection establishment support record, such as, for example, enhanced NOOP support record 138 (a special NOOP support record or a TXT record). When it is indicated that messaging server 184 supports altered connection establishment, for example, enhanced NOOP commands, failure to receive an appropriate response to address validation data 114 can indicate that connection initiation data 111 was not sent from messaging server 184.

The method 200 includes an act of generating appropriate connection response data based on the address validation data (act 203). Act 203 can include a sending computer system generating appropriate connection response data based on the address validation data. For example, sending messaging server 107 can generate appropriate connection response data 117 based on address validation data 114. When connection establishment data 113 is the last network packet in a plurality of network packets, sending messaging server 107 can generate an appropriate sequence number acknowledging receipt of the last network packet. When connection establishment data 113 is a request to retransmit connection initiation data 111, sending messaging server 107 can regenerate connection initiation data 111. When connection establishment data is an SMTP HELO response command or SMTP EHLO response command including non-standard data (e.g., a random sequence of characters), sending messaging server 107 can generate an enhanced NOOP command that includes the non-standard data.

The method 200 includes an act of sending the appropriate connection response data to the receiving computer system (act 204). Act 204 can include the sending computer system sending the appropriate connection response data to the receiving computer system. For example, sending messaging server 107 can send connection response data 116, which includes appropriate connection response 117, to receiving messaging server 109. Appropriate connection response 117 can include, for example, an appropriate acknowledgement sequence number, regenerated connection initiation data, or non-standard data. It may be that sending messaging server 107 includes a random sequence of characters, for example, from a received SMTP HELO command or SMTP EHLO command, in an enhanced NOOP command.

Receiving messaging server 109 can receive connection response data 116. However, it may be that receiving messaging server receives other connection response data that does not include an appropriate connection response or receives no connection response data at all. For example, if sending message server 107 is attempting to hijack a network address corresponding to message server 184, sending messaging server 107 may not receive address validation data 114 (because address validation data 114 is sent to message server 184). Thus, sending messaging server 107 may attempt to predict connection response data that is not based on address validation data 114. Accordingly, there is an increased chance that sending messaging server 107 predicts inappropriate (e.g., standard) connection response data.

The method 200 includes an act of determining if a computer system corresponding to the purported sending address appropriately responded to the address validation data (act 208). Act 208 can include a receiving computer system determining if a computer system corresponding to the purported sending address appropriately responded to the address validation data. For example, receiving messaging server 109 can determine if a computer system corresponding to address 112 appropriately responded to address validation data 114. Receipt of appropriate connection response 117 can indicate to receiving messaging server 109 that the computer system corresponding to address 112 did appropriately respond to address validation data 114. For example, an appropriate acknowledgment sequence number to a network packet containing connection establishment data 113, a retransmission of connection initiation data 111 in response to a request for retransmission, or an enhanced SMTP NOOP command including an echoed random sequence of characters, may indicate an appropriate connection response. When receiving messaging server 109 receives an appropriate connection response, there is a reduced chance that the purported network address has been hijacked.

In response to inappropriate connection data, a receiving messaging server can query a name server entry corresponding to the purported sending address. For example, receiving messaging server 109 can query entry 176 (an entry corresponding to address 112) to determine if messaging server 184 supports altered connection establishment. When it is indicated that messaging server 184 supports altered connection establishment data, for example, enhanced NOOP commands, receipt of inappropriate response data purported to be from messaging server 184 can indicate that connection initiation data 111 was not sent from messaging server 184.

Figure 3:
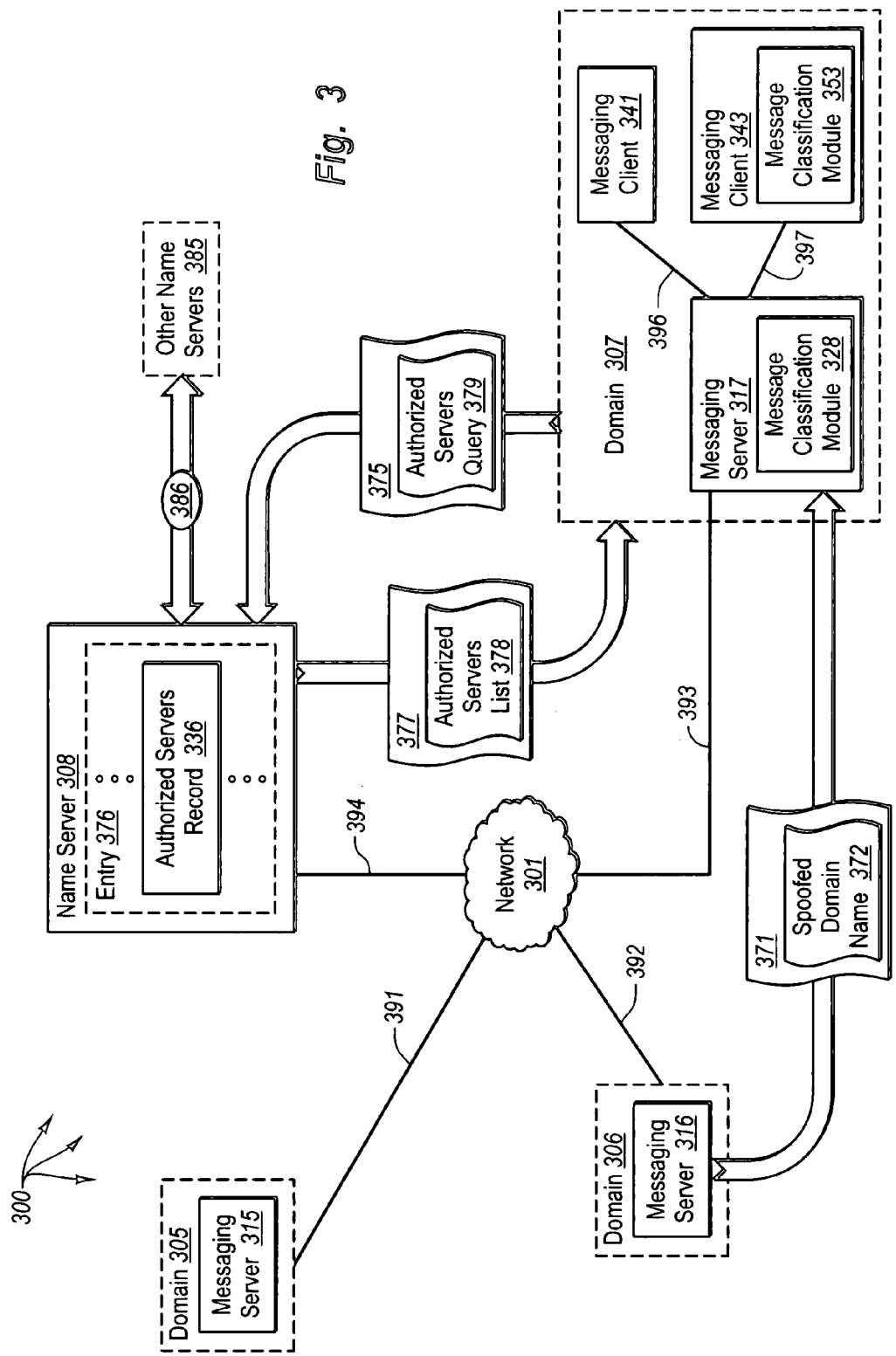
FIG. 3 illustrates an example of a network architecture that facilitates identifying authorized outgoing messaging servers in accordance with the present invention.

Referring now to FIG. 3, FIG. 3 illustrates an example of a network architecture 300 that facilitates identifying authorized outgoing messaging servers in accordance with the present invention. Depicted in network architecture 300 are domains 305, 306, and 307. Domains 305, 306, and 307 are depicted as dashed lines to illustrate that the domains 305, 306, and 307 logically include corresponding computer systems depicted inside the domains 305, 306, and 307. However, the physical locations of computer systems included in a domain can differ from one another. For example, messaging client 341 and messaging client 343 can be physically located in close proximity (e.g., the same room) or can be physically separated by a great distance (e.g., different continents).

Also depicted in network architecture 300 is name server 308. Name server 308 generally stores name information, such as, for example, correlating textual string identifiers for computer systems into corresponding numeric network addresses, for facilitating communication between computer systems in different domains. Name server 308 may be a Domain Name System ("DNS") server that translates domain names (e.g., www.test.com) into Internet Protocol ("IP") addresses (e.g., 102.33.23.112).

Name server 308 can store one or more records indicating authorized outgoing messaging servers for a domain. A record indicating authorized outgoing messaging servers for a domain, can be a DNS record, such as, for example, an RMX record, a TXT record, or a set of TXT records. A TXT record or a set of TXT records can contain text data or other data encoded in a textual form, such as, for example, XML instructions. Records indicating authorized outgoing messaging serves can be included in a DNS record set that indicates the electronic mail policy for a domain.

Also depicted in network architecture 300 is network 301. Domain 305, domain 306, domain 307, and name server 308 are connected to network 301 by corresponding links 391, 392, 393, and 394 respectively. Links 391, 392, 393 and 394 as well as network 301 can include a portion of a system bus, a portion of a local area network ("LAN"), a portion of a Wide Area Network ("WAN") and/or even a portion of the Internet. The domains and computer systems depicted in network architecture 300 can exchange electronic messages, such as, for example, electronic mail messages, DNS queries, and DNS answers (including resource records) over the depicted links. As illustrated by bi-directional arrow 386, name server 308 can also communicate with other name servers 385 for purposes of recursive queries. Similarly, computer systems in network architecture 300 can query other name servers 385 directly for purposes of iterative queries (although links connecting other computer systems network in architecture 300 to other name servers 385 are not expressly depicted).

Within domain 307, messaging clients 341 and 343 are connected to messaging 317 by corresponding links 396 and 397 respectively. Each of messaging clients 341 and 343 can include corresponding messaging interface modules (not shown), such as, for example, included in electronic mail client software. A messaging interface module provides a mechanism for a user of one of the messaging clients to access and view electronic messages from messaging server 317. A user (e.g., John Doe) can view electronic messages sent to an electronic messaging address (e.g., jdoe@test2.com) that has been assigned to and/or authorized for use by the user.

Figure 4:
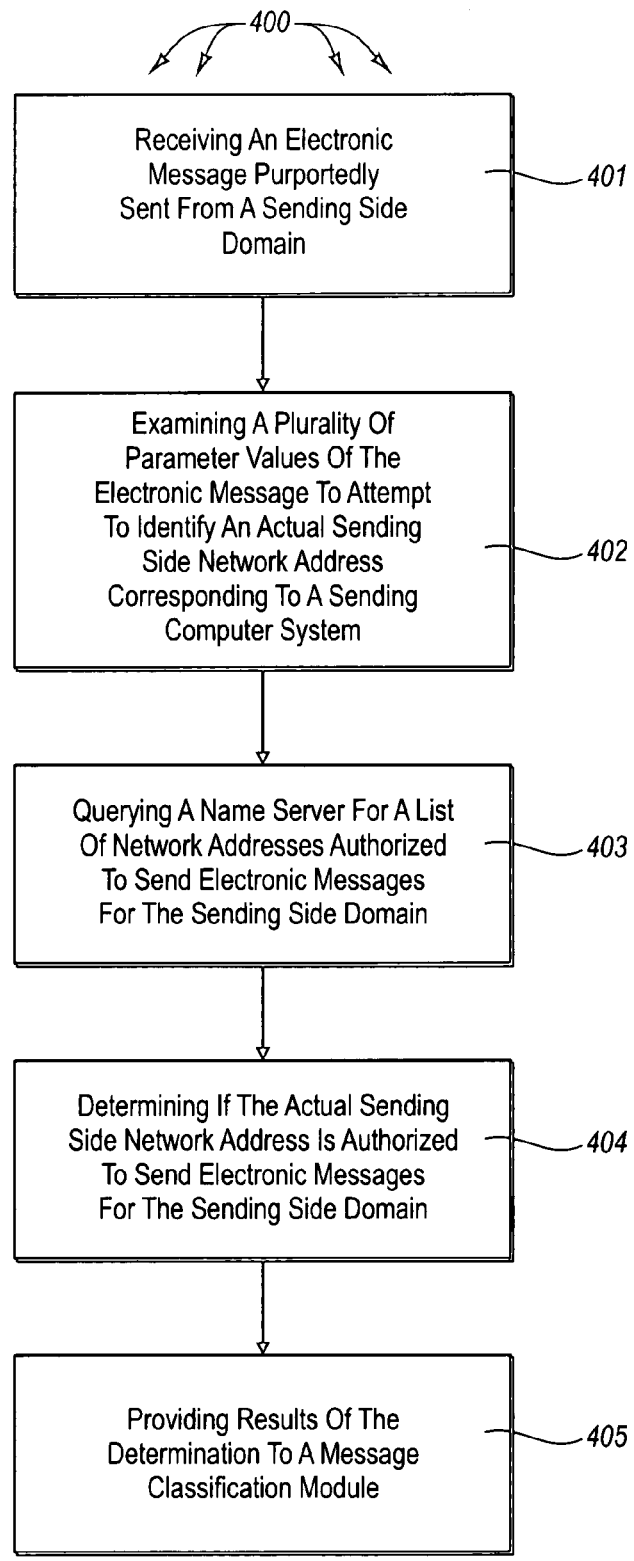
FIG. 4 illustrates an example flow chart of a method for identifying authorized outgoing messaging servers in accordance with the present invention.

FIG. 4 illustrates an example flow chart of a method 400 for identifying authorized outgoing messaging servers in accordance with the present invention. Unauthorized computer systems can alter one or more fields of an electronic message (which hereinafter may be referred to as "domain spoofing") to make an electronic message appear to have been transferred from a specified domain when in fact the electronic message (e.g., an electronic mail message) was not transferred from the specified domain. Accordingly, method 400 can also be viewed as providing an input indicating the likelihood that a domain name contained in an electronic message was spoofed. A high likelihood that a domain name was spoofed may be indicative (either alone or in combination with other inputs) of an electronic message being an unwanted and/or unsolicited electronic message.

The method 400 will be discussed with respect to the components illustrated in network architecture 300. The method 400 includes an act of receiving an electronic message purportedly sent from a sending side domain (act 401). Act 401 can include a receiving messaging server in a receiving domain receiving an electronic message purportedly sent from a sending side domain. For example, messaging server 317 (in domain 307) can receive electronic message 371 from messaging server 316. Electronic message 371 includes spoofed domain name 372 that indicates electronic message 371 was sent from domain 305.

A purported sending domain can be identified from parameter values contained in an electronic message. For example, messaging server 317 can identify domain 305 from parameter values contained in electronic message 371 (e.g., from spoofed domain name 372). The purported sending domain can be identified from the domain portion (e.g., characters after the "@" character) of the purported sending entity. Other parameter values in an electronic message can include the actual sending network address. For example, an actual sending network address can be included in a Reverse-Path of an electronic message (which may be referred to as the envelope From address). A Reverse-Path can be included in an electronic message as a result of a sending computer system issuing an SMTP "MAIL FROM" command. Thus, messaging server 371 can examine this parameter values for electronic message 371 to attempt to identify an actual sending network address (e.g., the actual IP address of the messaging server 316).

However, it may also be that an actual sending network address is included in a first Resent-Sender header of an electronic message, in a first mailbox in the Resent-From header of an electronic message, in a Sender header of an electronic message, or in a first mailbox of the From header of an electronic message. Accordingly, messaging server 371 can also examine each of these parameters values (either separately or in combination with examining a Reverse-Path parameter value) for electronic message 371 to attempt to identify an actual sending network address (e.g., the actual IP address of the messaging server 316). Since a number of different portions of an electronic message are examined, there is increased likelihood that the actual sending network address of the electronic message can be identified. Some electronic mail implementations require that electronic mail messages be sent with an empty Reverse-Path. Embodiments of the present invention can be advantageous for identifying an actual sending address when an electronic message does not include a Reverse-Path parameter value.

Based on spoofed domain name 372, messaging server 317 may identify domain 305 as the purported sending domain for electronic message 371. Electronic messages that do not contain a Reverse-Path or at least one of the listed headers may be considered unwanted and/or unsolicited. Considering such electronic messages as unwanted and/or unsolicited reduces the likelihood of an entity intentionally omitting a Reverse-Path and all of the headers to defeat a message classification module.

The method 400 includes an act of examining a plurality of parameters values of the electronic message to attempt to identify an actual sending side network address corresponding to the sending computer system (act 402). Act 402 can include a receiving side computer system identifying an actual sending side network address corresponding to the sending computer system. The receiving side computer system can identify an actual sending side network address, for example, from one or more of a Reverse-Path, a first Resent-Sender header, a first mailbox in the Resent-From header, a Sender header of an electronic message, or a first mailbox of the From header, of electronic message 371. Messaging server 317 can identify that an actual sending side IP address corresponds to messaging server 316. Method 200 can be utilized to decrease the likelihood of an IP address being spoofed.

The method 400 includes an act of querying a name server for a list of network addresses authorized to send electronic messages for the sending side domain (act 403). Act 403 can include the receiving computer system querying a name server for a list of network addresses authorized to send electronic messages for the sending side domain. For example, messaging server 317 can cause domain 307 to issue name service message 375, which includes authorized servers query 379, to name server 308. Name service message 375 can include an identifier that identifies domain 305.

Name server 308 can receive name service message 375 and process authorized servers query 379 accordingly. At name server 308, entry 376 may be a DNS entry that corresponds to domain 305. Entry 376 can contain one or more records (e.g., RMX and/or TXT records) for domain 305, including authorized servers record 336. Received TXT records can include XML instructions. Authorized servers record 336 can contain network addresses (e.g., IP addresses) corresponding to messaging servers that are authorized to send electronic messages for domain 105.

It may be that messaging server 315 has been designated as an authorized computer system for sending electronic message from domain 305 but messaging server 316 has not been designated as an authorized computer system for sending electronic message from domain 305. Thus, authorized servers record 336 can be configured to contain a network address corresponding to messaging server 315 (and possibly network addresses for other computer systems) but not to contain a network address corresponding to messaging server 316. Accordingly, in response to receiving name server message 375, name server 308 can send name server response 377, which includes authorized servers list 378, to domain 307. Domain 307 can receive name server response 377 and transfer name server response 377 to messaging server 317.

The method 400 includes an act of determining if the actual sending side network address is authorized to send outgoing electronic messages for the sending domain (act 404). Act 404 can include a receiving computer system determining if the actual sending side network address is authorized to send outgoing electronic messages for the sending domain. For example, messaging server 317 can determine if a network address corresponding to messaging server 316 is authorized to send electronic messages for domain 305.

A receiving computer system can compare an actual sending side network address to network addresses contained in an authorized servers list to determine if the actual sending side network address is authorized. For example, messaging server 317 can compare a network address corresponding to messaging server 316 to network addresses contained in authorized servers list 378 to determine if messaging server 316 is authorized to send electronic message for domain 305. When an actual sending side network address is not contained in a list of authorized network addresses for a domain, this indicates that a sending side computer system was not authorized to send an electronic message purporting as being from the domain. Accordingly, since messaging server 316 spoofed domain 305 by including spoofed domain name 372 in electronic message 371, messaging server 316 can be discovered as an unauthorized computer system. Transmission of an electronic message by an unauthorized computer system may be an indication that the electronic message is an unwanted and/or unsolicited electronic message.

On the other hand, when an actual sending side network address is contained in a list of authorized network addresses for a domain, this indicates that a sending side computer system was authorized to transfer an electronic message purporting as being from the domain. For example, messaging server 315 may legitimately include domain 305 in an electronic message and can be discovered as an authorized computer system. Transmission of an electronic message by an authorized computer system (e.g., messaging server 315) may be an indication that the electronic message is a legitimate electronic message.

The method 400 includes an act of providing the results of the determination to a message classification module (act 405). A message classification module can classify an electronic message as legitimate, unwanted, and/or unsolicited based on inputs provided to the message classification module. For example, messaging server 317 can provide the results of a determination with respect to messaging server computer system 316 (unauthorized) or with respect to messaging server 315 (authorized)) to message classification module 328. Based on provided results indicating messaging server 316 is unauthorized (either alone or in combination with other provided inputs) electronic mail classification module 328 may classify electronic message 371 as unwanted and/or unsolicited.

In some embodiments, a message classification module resides at a messaging client. For example, messaging client 343 includes message classification module 353. Thus, when appropriate, messaging server 317 can alternately provide the results of a determination (with respect to the authorization of a sending computer system to transfer an electronic message for a domain) to electronic mail classification module 353.

Figure 5:
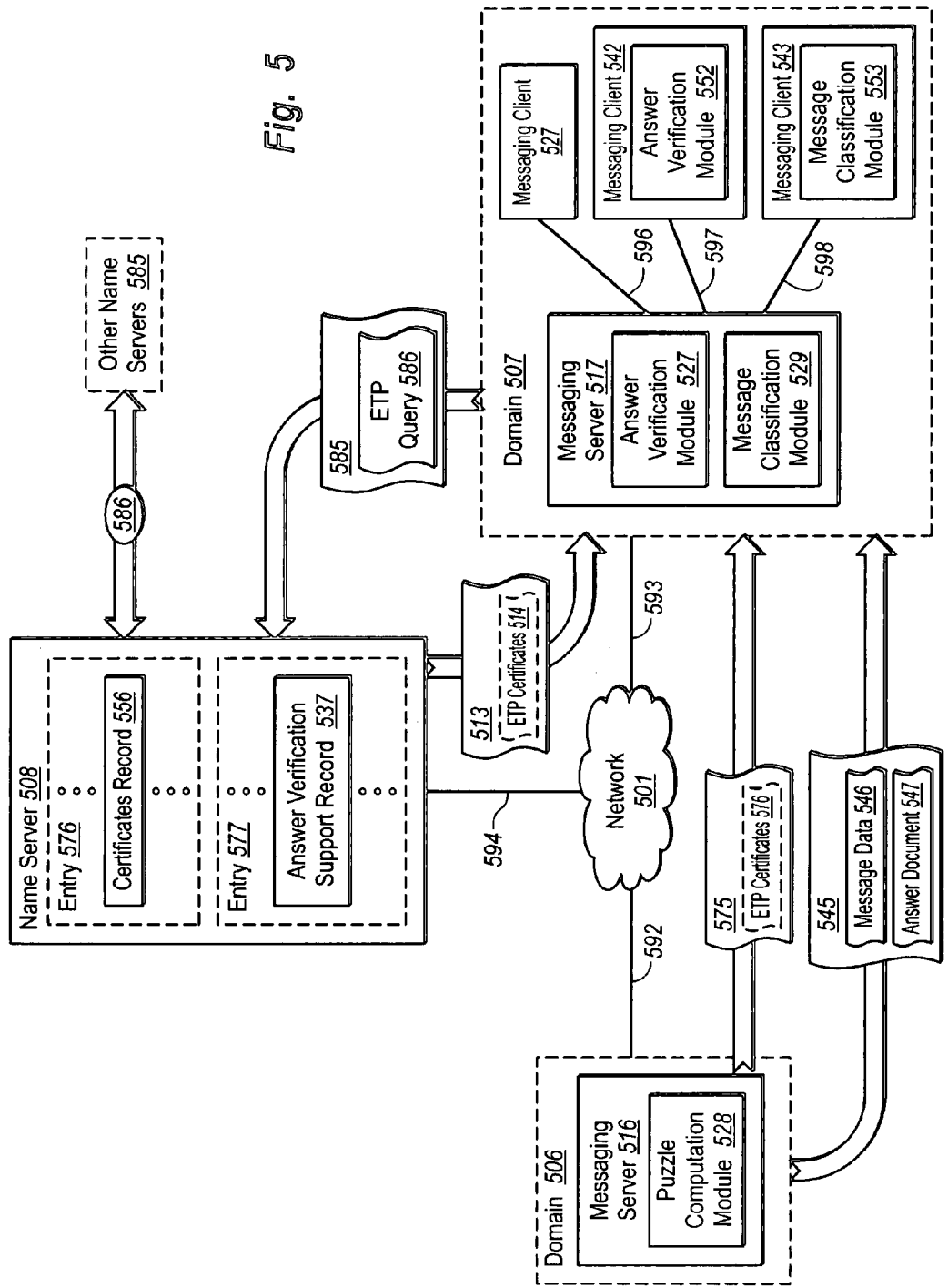
FIG. 5 illustrates an example of a network architecture that facilitates determining a sending domain's electronic message transmission policies and verifying solutions to computational puzzles in accordance with the present invention.

Referring now to FIG. 5, FIG. 5 illustrates an example of a network architecture 500 that facilitates identifying a sending domain's electronic message transmission policies and verifying solutions to computational puzzles in accordance with the present invention. Depicted in network architecture 500 are domains 506 and 507. Domains 506 and 507 are depicted as dashed lines to illustrate that the domains 506 and 507 logically include corresponding computer systems depicted inside the domains 506 and 507. However similar to network architecture 300, the physical locations of computer systems included in a domain of network architecture 500 can differ from one another Also depicted in network architecture 500 is name server 508. Name server 508 generally stores name information, such as, for example, correlating textual string identifiers for computer systems into corresponding numeric network addresses, for facilitating communication between computer systems in different domains. Name server 508 may be a Domain Name System ("DNS") server that translates domain names (e.g., www.test1.com) into Internet Protocol ("IP") addresses (e.g., 119.46.122.87). Name server 508 can also store records indicating that a domain adheres to one or more Electronic Message Transmission Policies (which hereinafter may be referred to as "ETPs") and records indicating a domain can solve and/or verify solutions to computational puzzles.

ETPs can be included in a DNS record, such as, for example, a special ETP record, a TXT record, or a set of TXT records. A TXT record or a set of TXT records can contain text data or other data encoded in a textual form, such as, for example, XML instructions. Records identifying ETPs can be included in a DNS record set that indicates the electronic mail policy for a domain. ETPs can be included in existing authorization frameworks and technologies for representing attestations associated with electronic message policies. For example, ETPs can be contained in X.509 certificates, eXtensible rights Markup Langue ("XrML") licenses, or Kerberos PACs, that are stored in DNS records.

An ETP can include referencing text that binds to a domain and can be issued by a mutually trusted source. For example, an issued X.509 certificate can include a routing address that matches the domain. This supplies some binding of the stated policies to the domain over and above retrieving the policies from DNS.

Computational puzzle support indicators can be included in a DNS record, such as, for example, a special Puzzle Support record, a TXT record, or a set of TXT records. A TXT record or set of TXT records can contain text data or other data encoded in a textual form, such as, for example, XML instructions. Records indicating support for computation puzzles can be included in a DNS record set that indicates the electronic mail policy for a domain.

Also depicted in network architecture 500 is network 501. Domain 506, domain 507, and name server 508 are connected to network 501 by corresponding links 592, 593, and 594 respectively. Links 592, 593, and 594 as well as network 501 can include a portion of a system bus, a portion of a local area network ("LAN"), a portion of a Wide Area Network ("WAN") and/or even a portion of the Internet. The domains and computer systems depicted in network architecture 500 can exchange electronic messages, such as, for example, electronic mail messages, DNS queries, and DNS answers (including resource records) over the depicted links. As illustrated by bi-directional arrow 586, name server 508 can also communicate with other name servers 585 for purposes of recursive queries. Similarly, computer systems in network architecture 500 can query other name servers 585 directly for purposes of iterative queries (although links connecting other computer systems network in architecture 500 to other name servers 585 are not expressly depicted).

Within domain 507, mail clients 541, 542, and 543 are connected to messaging server 517 by corresponding links 596, 597, and 598 respectively. Each of mail clients 541, 542, and 543 can include corresponding electronic messaging interface modules (not shown), such as, for example, included in electronic mail client software. An electronic messaging interface module provides a mechanism for a user of one of the mail clients to access and view electronic messages. A user (e.g., Jane Smith) can view electronic messages sent an electronic messaging address (e.g., jsmith@test12.net) that has been assigned to and/or authorized for use by the user.

Figure 6:
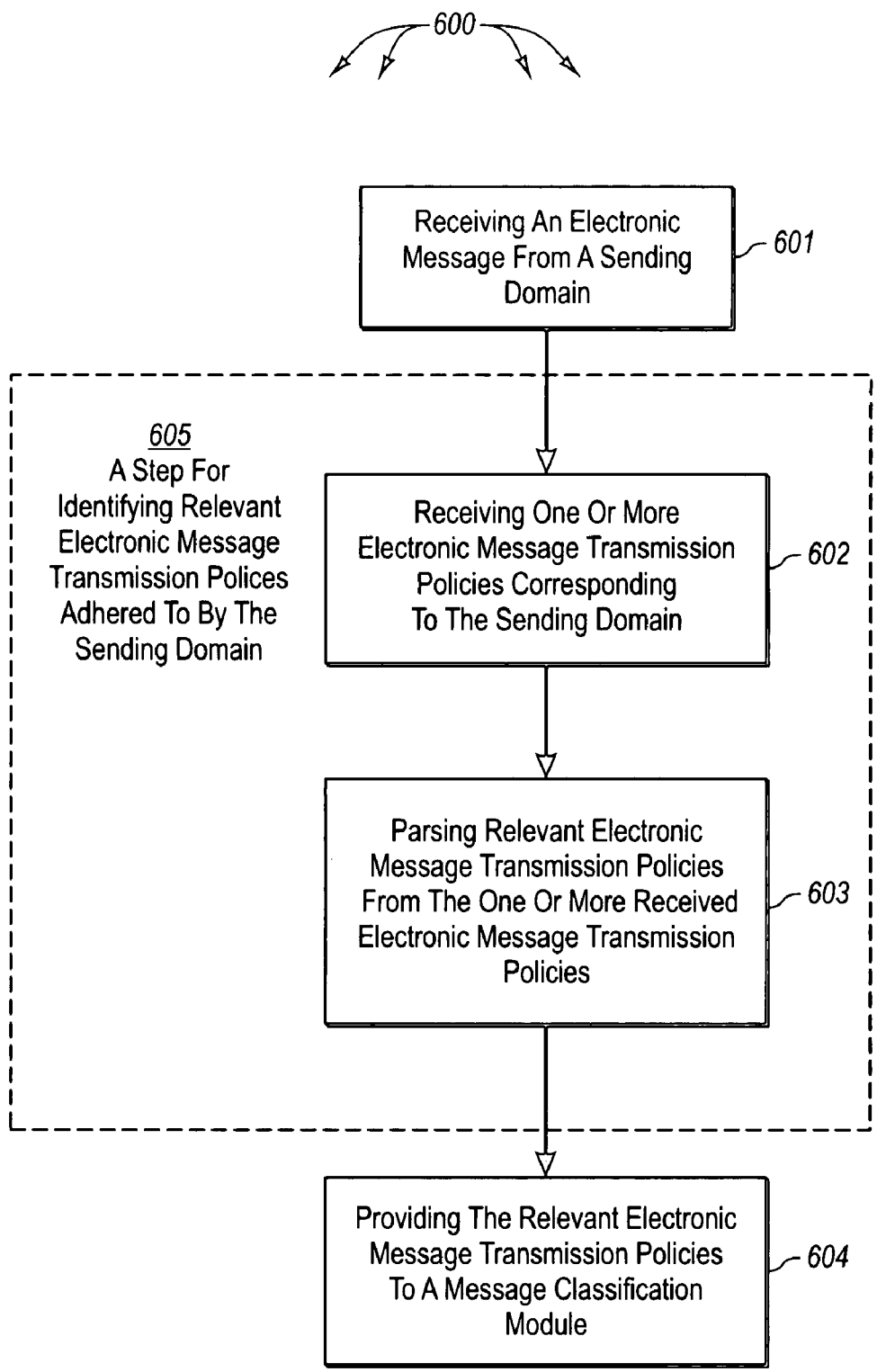
FIG. 6 illustrates an example flow chart of a method for determining a sending domain's electronic message transmission policies in accordance with the present invention.

FIG. 6 illustrates an example flow chart of a method 600 for determining a sending domain's electronic message transmission policies in accordance with the present invention. It may be that a domain that sends electronic messages adheres to one or more ETPs. A domain's adherence to certain ETPs may indicate a reduced likelihood that the domain sends (or allows other domains to send) unwanted and/or unsolicited electronic messages. On the other hand, a domain's non-adherence to the certain ETPs may indicate an increased likelihood that the domain sends (or allows other domains to send) unwanted and/or unsolicited electronic messages. In some embodiments, it may be appropriate to identify a domain's ETPs after determining an actual sending network address has not been hijacked (e.g., in accordance with method 200) and after determining a sending domain is not being spoofed (e.g., in accordance with method 400).

The method 600 will be discussed with respect to the components illustrated in network architecture 500. The method 600 includes an act of receiving an electronic message from a sending domain (act 601). Act 601 can include a receiving computer system receiving an electronic message (e.g., an electronic mail message) from a sending domain. For example, messaging server 517 can receive electronic message 575 (e.g., an electronic mail message) from messaging server 516. Electronic message 575 optionally includes ETP certificates 576 that represent ETPs adhered to by domain 506.

The method 600 includes a functional result-oriented step for identifying relevant electronic message transmission polices adhered to by the sending side domain (e.g., as included in some predefined standard) (step 605). Step 605 can include any corresponding acts for identifying electronic message transmission polices adhered to by the sending side domain. However, in the method illustrated in FIG. 6, step 605 includes a corresponding act of receiving one or more electronic message transmission policies corresponding to the sending side domain (act 602).

Act 602 can include a receiving computer system receiving one or more electronic message transmission policies corresponding to the sending side domain. For example, messaging server 517 can receive electronic message 575, which includes ETP certificates 576. ETP certificates 576 can be one or more X.509 certificates that indicate the ETP's adhered to by domain 506.

In some embodiments, a Secure Multipurpose Internet Mail Extensions ("S/MIME") electronic message (which hereinafter may be referred to as an "ETP S/MIME" message) is signed with the intent of conveying a policy of reasonable electronic messaging behavior. An ETP S/MIME message can be an S/MIMEv3-compliant electronic message. An ETP S/MIME message can be of the format multipart/signed and can include two MIME parts. A first MIME part can include the portion of the electronic message (e.g., a clear-text representation of the message) that is to be signed. A second MIME part can include a detached signature of the first MIME part A detached signature can be created under the auspices of an ETP certificate. ETP S/MIME messages can be implemented in an entirely-in-headers mode providing increased backward compatibly of signed mail with non-signature-aware messaging systems.

Electronic message recipients can identify entities that violate their ETP agreements. Accordingly, an electronic message recipient may attempt to determine whether or not a certificate in an ETP S/MIME has been revoked. There are at least four ways an electronic message recipient can attempt to determine if a certificate has been revoked. In one embodiment, the electronic message recipient queries the certificate issuer to ask if the certificate has been revoked. In another embodiment, the electronic message recipient maintains a list of revoked certificates, periodically updated by trusted certificate issuers. When an ETP S/MIME message is received, the electronic message recipient can check the list to determine if an included certificate has been revoked. In yet another embodiment, the electronic message recipient maintains a list of all currently trusted certificates. When an ETP S/MIME message is received, the electronic message recipient can check the list to determine if an included certificate is trusted.

In yet a further embodiment, proof-of freshness is included in an ETP S/MIME message along with an included certificate. For example, an ETP S/MIME message can include a certificate from an issuer indicating that during some (potentially recent) time frame (e.g., 1 minute or 15 minutes), the certificate is still valid. If the electronic message recipient receives the ETP S/MIME message during the time frame, or a time not much longer, the certificate is considered fresh. On the other hand, if the electronic message recipient receives the ETP S/MIME message some significant amount of time after the time frame, the electronic message recipient may resort to one of the other mechanisms, for example, querying the certificate issuer to see if the certificate has been revoked.

Including proof-of-freshness in an ETP S/MIME message may have large efficiency advantages for electronic message recipients. For example, including proof-of-freshness in an ETP S/MIME can significantly reduce the number of queries an electronic mail recipient initiates. Including proof-of-freshness in an ETP S/MIME message also has limited, if any, impact on electronic message senders. For example, an electronic message send can be configured to only occasionally (e.g., every 15 minutes) request a new proof-or-freshness, which can then be included in any number of electronic messages. The number of queries to certificate issuers is thus reduced by a large factor.

Messaging server 517 can also cause a query of a name server for ETPs corresponding to a sending side domain. For example, messaging server 517 can cause domain 507 to issue name server message 585, which includes ETP query 586. Name server message 585 may be an appropriate DNS query message. Name server message 585 can include an identifier that identifies domain 506.

Name server 508 can receive name service message 585 and process ETP query 586 accordingly. At name server 508, entry 576 may be a DNS entry that corresponds to domain 506. Entry 576 can contain one or more records (e.g., special ETP records and/or a TXT records) for domain 305, including certificates record 556. A TXT record or set of TXT records can include XML instructions. Certificates record 556 can contain one or more ETP certificates (e.g., X.509 certificates) that indicate ETPs adhered to by domain 506.

It may that domain 506 is configured not to adhere to ETPs. Thus, entry 576 may contain electronic messaging configuration information indicating domain 506 does not adhere to ETPs. Accordingly, certificates record 556 may not contain any certificates, or certificates 556 may not even be included in entry 576. When domain 506 does not adhere to ETPs, name server response 514 can be configured to indicate that domain 506 does not adhere to ETPs. Accordingly, in response to receiving name server message 585, name server 508 can send name server response 513 with an indication that domain 506 does not support ETPs On the other hand, it may be that domain 506 has been configured to adhere to one or more ETPs. Thus, certificates record 556 can be configured with certificates that contain the one more ETPs. Accordingly, in response to receiving name server message 585, name server 508 can send name server response 513, which includes ETP certificates 514 to domain 507. Domain 507 can receive name server response 513 and transfer name server response 513 to messaging server 517.

Step 605 includes a corresponding act of parsing relevant electronic message transmission policies from one or more received electronic message transmission policies (act 603). Act 603 can include a receiving computer system parsing relevant electronic message transmission policies from one or more received electronic message transmission policies. For example, messaging server 517 can parse ETPs for domain 506 from ETP certificates 576 and/or ETP certificates 514. Some ETPs may be agreed to by a number of organizations representing what is reasonable messaging transmission behavior.

Policies can be developed based on what is appropriate behavior for particular groups of organizations. However, there is no requirement that any one set of policies be universally adhered to by all messaging users. Although a domain's adherence to some policies, such as, for example, sending electronic messages at a relatively low rate and/or refraining from sending electronic messages to large numbers of addresses, may indicate that an electronic message from the domain has a reduced likelihood of being unwanted and/or unsolicited. On the other hand, non-adherence to these policies may indicate that an electronic message from the domain has an increased likelihood of being unwanted and/or unsolicited.

The method 600 includes an act of providing the relevant electronic message transmission policies to a message classification module (act 604). Act 604 can include a receiving computer system providing the relevant electronic message transmission policies to a message classification module. For example, messaging server 517 can provide relevant ETPs for domain 506 to message classification module 529. Based on relevant ETPs (either alone or in combination with other provided inputs), message classification module 529 may classify electronic message 575 as a legitimate electronic message or as an unwanted and/or unsolicited electronic message. Alternately, and when appropriate, messaging server 517 can provide relevant ETPs for domain 506 to message classification module 553. Based on relevant ETPs (either alone or in combination with other provided inputs), message classification module 553 may classify electronic message 575 as a legitimate electronic message or as an unwanted and/or unsolicited electronic message.

Figure 7:
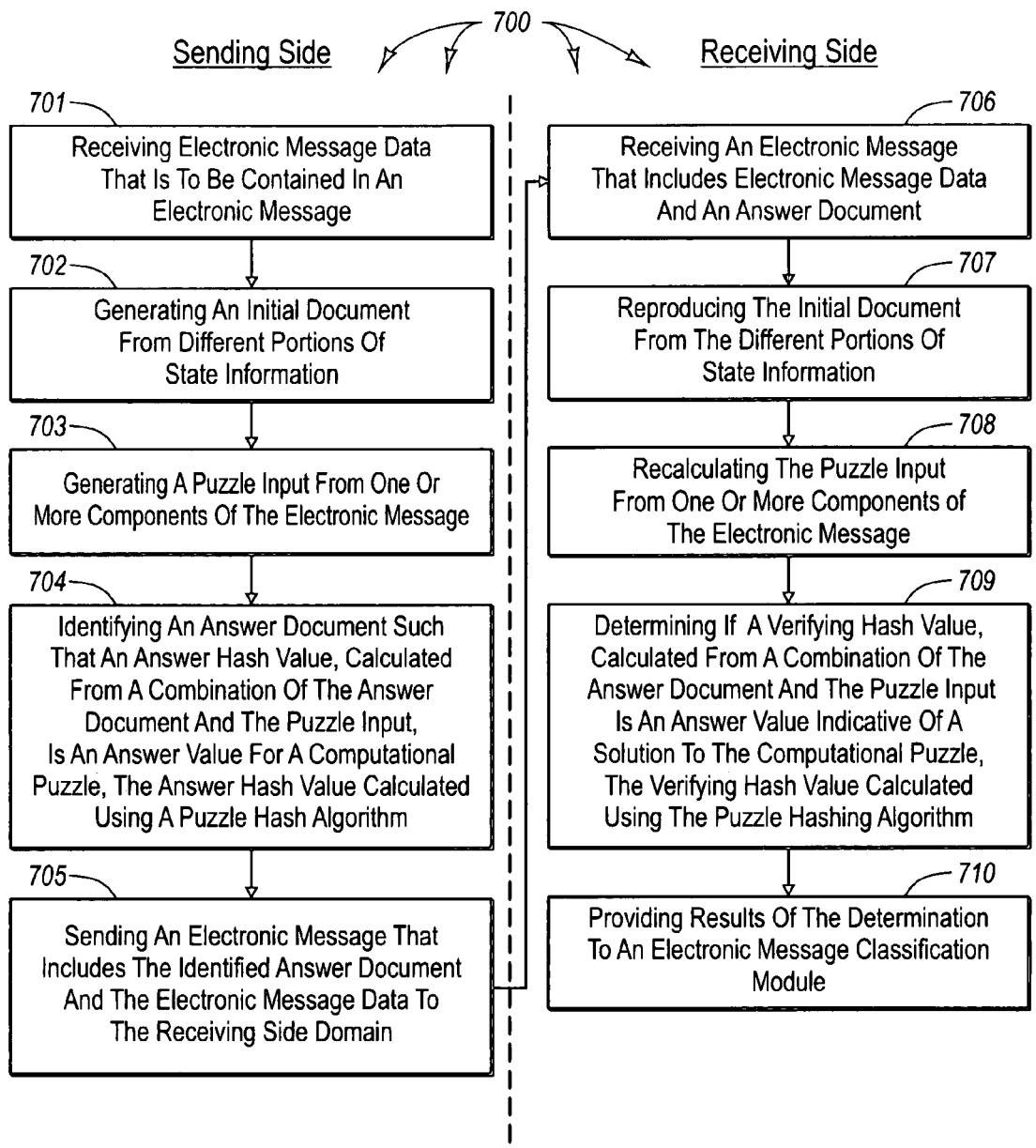
FIG. 7 illustrates an example flow chart of a method for verifying solutions to computational puzzles in accordance with the present invention.

FIG. 7 illustrates an example flow chart of a method 700 for verifying solutions to computational puzzles in accordance with the present invention. Completion of a computational puzzle can indicate that a sending computer system expended a number of processor cycles before sending an electronic message. Providing an indication of expended processor cycles is evidence that the sending computer system is not sending out electronic messages at a relatively high rate and evidence of consumed financial resources. Thus, electronic messages from the sending computer system potentially have a reduced likelihood of being unwanted and/or unsolicited.

The method 700 will be described with respect to the computer systems and modules depicted in network architecture 500. The method 700 includes an act of receiving electronic message data that is to be contained in an electronic message (act 701). Act 701 can include a sending messaging server or a sending messaging client receiving electronic message data that is to be contained in an electronic message (e.g., an electronic mail message). Message data can include any data that is to be included in a header or body portion of an electronic message. For example, a messaging client connected to messaging server 516 can receive message data (e.g., electronic addresses, a subject, a message body, etc.)

that is to be included in header and/or body portions of electronic message 545. At messaging server 516, electronic message data may already be contained in an electronic message (e.g., in electronic message 545) that is to be delivered. Accordingly, message server 516 can extract portions of electronic message data (e.g., portions of message data 546) for processing before the corresponding electronic message is delivered.

Before calculating a solution to a computational puzzle, it can be verified that a receiving side domain is configured to verify solutions to computational puzzles. It may be that a receiving computer system, such as, for example, a receiving messaging server, advertises in a name entry that it is configured to verify solutions to computational puzzles. For example, it may be that entry 577 stores name information for domain 507. Included entry 577 is answer verification support record 537 that indicates domain 507 is configured to verify answers to computational puzzles. Answer verification support record 537 can be a DNS record, such as, for example, a special Puzzle Support record, a TXT record, or a set of TXT records. A TXT record or set of TXT records contain text data or other data encoded in a textual form, such as, for example, XML instructions.

Accordingly, messaging server 516 can query name server computer system 508 (e.g., by sending an appropriate DNS query message) to determine if domain 507 can verify solutions to computational puzzles. In response to the query, name server 508 can return an indication included answer verification support record 537 (e.g., by sending an appropriate DNS response message), which is received at domain 506. Domain 506 can appropriately transfer the received indication to messaging server 516.

The method 700 includes an act of generating an initial document from different portions of the state information (act 702). Act 702 can include a sending computer system generating an initial document from different portions state information. For example, messaging server 516 can generate an initial document from different portions of message data 546. In some embodiments, generating an initial document from different portions of message data can include extracting different portions of message data from an electronic message. It may be that a sending messaging server receives an electronic message (e.g., from a messaging client) that is to be transferred to a receiving messaging server. For example, messaging server 516 can receive an electronic message, containing message data 546, that is to be transferred to messaging server 517.

Messaging server 516 can extract portions of message data 546 that are to be included in electronic message 545. For example, messaging server 516 can extract a portion of data that is to be included in a From field, a To field, a NotBefore field, a NotAfter field, a Date field, a Body field, an Attachment field, a Subject field, and/or a Message-ID field, etc. of electronic message 545. Extracting portions of data can include extracting virtually any type of data, such as, for example, text data, graphical data, Uniform Resource Identifier ("URI") data, executable data, etc., that can be included in an electronic message. Messaging server 516 can then concatenate the extracted portions to generate an initial document.

An initial document can also be generated from state information, such as, for example, a message unique nonce (e.g., a randomly generated number or string). For example, messaging server 516 can generate a unique random string of 128 bits to include in electronic message 545. A nonce can be concatenated to one or more portions of message data to generate an initial document.

The method 700 includes an act of generating a puzzle input from one or more components of the electronic message (act 703). Act 703 can include a sending computer system generating a puzzle input from one or more components of the electronic message. For example, puzzle computation module 528 can generate a puzzle input from one or more components (e.g., message body, message attachments, and message headers) of electronic message 545. Generating a puzzle input can include extracting, hashing, concatenating, or performing other operations on components of an electronic message.

In some embodiments, the puzzle input is the initial document. In other embodiments, a puzzle input can be a puzzle input hash value calculated by providing the initial document as input to an initial hash algorithm. An initial hash algorithm can be utilized to generate uniform length input resulting in more uniform puzzle solving times. An initial hash algorithm can be the puzzle hash algorithm used when calculating answer documents.

A puzzle hash algorithm can be specifically designed for use in deterring unwanted and/or unsolicited electronic messages. It may be that a hash algorithm, such as, for example, the SHA-1 algorithm, includes a plurality of sub-functions that are applied to different corresponding portions of input at different times during hash value creation. Embodiments of the present invention alter a hashing algorithm's standard operation by altering the standard correspondence between sub-functions and portions of input. The same sub-functions can be utilized, however the sub-functions are applied to different portions of data than they would have otherwise been applied to during standard operation. For example, a puzzle hash algorithm can utilize hashing sub-functions of the SHA-1 algorithm but apply the sub-functions in an order that differs from the SHA-1 algorithm. Applying sub-functions in a different order makes the puzzle hash algorithm more difficult to implement in hardware.

For example, where SHA-1 specifies eighty sub-functions according to the following formulas:

$f_t(B,C,D) = (B \text{ AND } C) \text{ OR } ((\text{NOT } B) \text{ AND } D)$
  $(0 <= t <= 19)$ $f_t(B,C,D) = B \text{ XOR } C \text{ XOR } D \ (20 <= t <= 39)$ $f_t(B,C,D) = (B \text{ AND } C) \text{ OR } (B \text{ AND } D) \text{ OR } (C \text{ AND } D) \ (40 <= t <= 59)$ $f_t(B,C,D) = B \text{ XOR } C \text{ XOR } D \ (60 <= t <= 79)$ the altered SHA-1 algorithm specifies the eighty sub-functions according to the following formulas:

$f_t(B,C,D) = B \text{ XOR } C \text{ XOR } D \ (0 <= t <= 19)$ $f_t(B,C,D) = (B \text{ AND } C) \text{ OR } ((\text{NOT } B) \text{ AND } D)$
  $(20 <= t <= 39)$ $f_t(B,C,D) = B \text{ XOR } C \text{ XOR } D \ (40 <= t <= 59)$ $f_t(B,C,D) = (B \text{ AND } C) \text{ OR } (B \text{ AND } D) \text{ OR } (C \text{ AND } D) \ (60 <= t <= 79)$ Table 1 illustrates examples of text data along with their corresponding altered SHA-1 hash output:

TABLE 1

| Test Data | Altered SHA-1 Hash Output |
|---|---|
| the string "abc" | 6092C49D |
| | 8092E074 |
| | 4B14298E |
| | 12E00ED2 |
| | DE4611A0 |
| the string | 7D3E33E1 |
| "abcdbcdecdefdefgefghfghighijhijkijkljklmklmnlmnomnopnopq" | 8BB7F842 |
| | 9055CB29 |
| | 40BE227F |
| | CF562276 |
| a string consisting of 1,000,000 a's | 21F4D548 |
| | 88AF926B |
| | 9DF19A69 |
| | EC753DDD |
| | 850D7E20 |
| an empty string | D212F400 |
| | 92F2D374 |
| | E86AB4E4 |
| | C1BE75D3 |
| | 7853FDBA |

The method 700 includes an act of identifying an answer document such that an answer hash value calculated from a combination of the answer document and the puzzle input is an answer value for a computational puzzle (act 704). Act 704 can include a sending computer system identifying an answer document such that an answer hash value calculated from a combination of the answer document and the puzzle input is an answer value for a computational puzzle. For example, puzzle computation module 528 can identify an answer document that results in an answer hash value that is an answer for a computational puzzle.

In one embodiment, a computational puzzle is to identify an answer document that when combined with the puzzle input, (e.g., the initial document or a puzzle input hash value) and the combination of the answer document and puzzle input is then hashed, (e.g., using the altered SHA-1 algorithm) results in a hash value having a specified value in a plurality of bit positions (e.g., bit positions interspersed throughout a resulting hash value). For example, a computational puzzle may be to identify an answer document that results in a hash value having a one value in the second bit position and a zero value in the thirteenth and fifty-fourth bit positions. However, embodiments of the present invention are not limited to any particular plurality of bit positions or specified values.

In a more specific implementation, a computational puzzle is to identify an answer document that when prepended to puzzle input, and the concatenation of the answer document and puzzle input is then hashed, results in a hash value having zero in at least the first n bits (e.g., taking the most significant bit first within each byte taken in order). For example, a computational puzzle may be to identify an answer document that results in a hash value having a zero value in the first 16 bits. Generally, identifying an answer document can include forming H(Answer Document°Puzzle Input). More specifically, identifying an answer document could include forming H(Answer Document°Initial Document) or H(Answer Document°H(Initial Document)). For some n considered sufficiently large, it may be that no means other than brute force is satisfactory for identifying an answer document.

To reduce variance in the expected time to solve a computational puzzle, a first plurality of bit positions ("Set A") and a specified value for each bit in Set A is selected. A second disjoint plurality of bit positions ("Set B") is also selected. A puzzle solution is a plurality of answer documents ("Set S") of a specified size, where each answer document, when concatenated with the puzzle input and hashed, has the specified value at each bit position in Set A and agrees with the corresponding hash value for every other answer document in every bit position of Set B.

In a more specific implementation of variance reduction, Set A is a prefix of a resulting hash value and Set B is a suffix of the resulting hash value. Thus, a computation puzzle may be to identify a Set S such that when each answer document is prepended to puzzle input, and the concatenation of each answer document and puzzle input is then hashed, results in a hash value having zero in at least the first n bits (Set A) and having an identical last m bits (Set B) For example, a computational puzzle could be to identify 16 answer documents that result in a hash value having zero in the first 24 bits and the same value (either zero or one) in their in the last 12 bits. Alternately, the first 24 bits and/or the last 12 bits could be a specified bit pattern interspersing zero values and one values.

The expected time to solve a computation puzzle can be configured by varying the sizes of set A, set B, and/or set S. The size of set A can be varied to obtain an appropriate expected solution time. The size of set B and the size of set S can be varied to obtain an appropriate solution variance. Configuring a computational problem to have a longer solution time results in a corresponding increase in the computational resources that are expended to identify solutions. On the other hand, configuring computational problem to have shorter a solution time results in a corresponding decrease in the computational resources that are expended to identify solutions. Messaging servers (e.g., messaging servers 516 and 517) can agree to a specified solution time or can query corresponding resource records to identify a specified solution time. For example, messaging server 516 can query entry 577 to identify a specific solution time for domain 507.

In some embodiments, a one-way puzzle hash function is utilized. It may be that a one-way puzzle hash function is specifically designed for use in deterring unwanted and/or unsolicited electronic messages. A one-way puzzle hash function can be an alteration of a known one-way hash, with the intent or preventing hardware acceleration. More particularly, the one-way puzzle hash function can include a significant number of divide operations as divide operations are difficult to accelerate with hardware.

A sending computer system can include an identified answer document (or answer documents) along with the electronic message data in an electronic message. For example, messaging server 516 can include answer document 547 along with message data 546 in electronic message 545 (e.g., an electronic mail message). The method 700 includes an act of sending an electronic message that includes the identified answer document and the electronic message data to the receiving side domain (act 705). Act 705 can include a sending computer system sending an electronic message that includes the identified answer document (or answer documents) and the electronic message data to the receiving side domain. For example, messaging server 516 can send electronic message 545, which includes answer document 547 and message data 546, to domain 507. Domain 507 can transfer electronic message 545 to messaging server 517. Although electronic message 545 is depicted as including a single answer document (answer document 547), it may be that electronic message 545 includes a one or more additional answer documents.

The method 700 includes an act of receiving an electronic message that includes electronic message data and an answer document (act 706). Act 706 can include a receiving computer system receiving an electronic message that includes electronic message data and an answer document (or answer documents). For example, messaging server 517 can receive electronic message 545, which includes answer document 547 and message data 546. When an electronic message is to be delivered to a particular messaging client, a messaging server can forward the electronic message on to the messaging client. For example, when appropriate, messaging server 517 can transfer electronic message 545 on to messaging client 542. Messaging client 542 can receive electronic message 545.

The method 700 includes an act of reproducing the initial document from the different portions of state information (act 707). Act 707 can include a receiving computer system reproducing an initial document from different portions state information. For example, answer verification module 527 and/or answer verification module 552 can reproduce an initial document from portions of message data 546 or other state information contained in electronic message 454 (e.g., a nonce). Similar to the calculation of the initial document, answer verification module 527 and/or answer verification module 552 can extract and concatenate portions of message data 546 or other state information to reproduce the initial document.

The method 700 includes an act of re-calculating the puzzle input from the one or more components of the electronic message (act 708). A puzzle input can be re-calculated to be the initial document or a puzzle input hash value calculated using the same puzzle hash algorithm (e.g., an altered SHA-1 algorithm) used at the sending computer system. For example, answer verification module 527 and/or answer verification module 552 can use the same puzzle hash algorithm used by puzzle computation module 528 to re-calculate the puzzle input hash value from the reproduced initial document. Thus, puzzle input calculated at a sending computer system is recalculated at a receiving computer system.

The method 700 includes an act of determining if a verifying hash value calculated from a combination of the answer document and the puzzle input is an answer value indicative of a solution to the computational puzzle (act 709). Act 709 can include a receiving computer system determining if a verifying hash value calculated from a combination of the answer document and puzzle input is an answer value indicative of a solution to the computational puzzle. For example, answer verification module 527 and/or answer verification module 552 can utilize the general formula H(Answer Document°Puzzle Input) to determine if a verifying hash value is indicative of a solution. A verifying hash value can be indicative of a solution when the verifying hash value has a specified value in a plurality of fixed bit positions interspersed throughout the verifying has value (e.g., the first n bits).

In some embodiments, a plurality of verifying hash values are calculated from the combination of a plurality of answer documents and the puzzle input. In these embodiments, a verifying hash value can be indicative of solution when the verifying hash value has a specified value in a first plurality of bit positions (e.g., in a hash value prefix) and has a value equal to other verifying hash values resulting from other answer documents in a second plurality of bit positions (e.g., in a hash value suffix).

When a verifying hash value is a solution to a computational problem, expended computational resources can at least be estimated. That is, a verifiable solution to a computational puzzle can indicate to a receiving computer system that a sending computer system expended processor cycles and memory resources in a brute force approach to solve the computational puzzle. For example, when a verifying hash value is a solution to a computational puzzle based on message data 546, this indicates to answer verification module 527 and/or answer verification module 552 that message server 516 expended processor cycles. On the other hand, when a verifying hash value is not a solution to the a computational problem, this indicates that the sending computer system potentially did not expended processor cycles in a brute force approach to solve the computational puzzle. For example, when a verifying hash value is not a solution to a computational puzzle based on message data 546, this indicates to answer verification module 527 and/or answer verification module 552 that message server 516 potentially did not expend processor cycles.

The method 700 includes an act of providing results of the determination to a message classification module (act 710). Act 710 can include a receiving computer system providing results of the determination to a message classification module. For example, messaging server 517 can provide results of a determination with respect to messaging server 516 to (indicating that messaging server 516 did or did not expend processor cycles) to message classification module 529. Based on a provided determination indicating that messaging server 516 did expended computational resources (either alone or in combination with other provided inputs), message classification module 529 may classify electronic message 545 as legitimate. On the other hand, based on a provided determination indicating that messaging server 516 potentially did not expend computational resources (either alone or in combination with other provided inputs), message classification module 529 may classify electronic message 545 as unwanted and/or unsolicited. Alternately and when appropriate, messaging server 517 can provide results indicating that messaging server 516 did or potentially did not expended computational resources to message classification module 553.

In some embodiments of the present invention either an indication that a domain supports specified ETPs or an indication that a sending computer system has solved a computational puzzle provides sufficient evidence that an electronic message is legitimate. For example, it may that a sending entity lacks the financial resources or the desire to utilize BTP certificates. However, the sending entity may still desire to indicate to a receiving computer system that an electronic message is legitimate. Thus, the sending entity can configure a sending computer system to calculate an answer to a computational puzzle and include an answer document in the electronic message.

A receiving computer system can be configured to attempt to identify ETP certificates for a domain associated with the sending entity. The receiving computer system can be further configured to verify the answer to a computational puzzle when no ETP certificates are identified. Thus, the receiving computer system may initially parse the electronic message or query a name server for ETP certificates corresponding to a domain associated with the sending entity. If ETP certificates are identified and the ETP certificates indicate support for particular ETPs, support for the particular ETPs can be sufficient evidence of the electronic message being legitimate. However, if no ETP certificates are identified or identified ETP certificates do not indicate support for the particular ETPs, the receiving computer system can subsequently attempt to verify an included solution to the computational puzzle.

A schema can be used to constrain the meaning of electronic messaging information. The following example XML schema can be used to constrain the meaning of electronic messaging information associated with a domain:

```
<?xml version="1.0" encoding="UTF-8"?>
<xs:schema targetNamespace="http://lessspam.org/1" xmlns="http://lessspam.org/1"
xmlns:xs="http://www.w3.org/2001/XMLSchema" elementFormDefault="qualified"
attributeFormDefault="unqualified" blockDefault="#all">
    <xs:element name="emailPolicy">
        <xs:complexType>
            <xs:sequence>
                <xs:element name="inbound" minOccurs="0">
                    <xs:annotation>
                        <xs:documentation>Policies regarding mail that is received by the entity.
                        </xs:documentation>
                    </xs:annotation>
                    <xs:complexType>
                        <xs:choice minOccurs="0" maxOccurs="unbounded">
                            <xs:element name="hashedSpam">
                                <xs:complexType>
                                    <xs:attribute name="minDifficulty" type="xs:nonNegativeInteger">
                                        <xs:annotation>
                                            <xs:documentation>The minimum acceptable level of difficulty in
                                                the puzzle solution.
                                            </xs:documentation>
                                        </xs:annotation>
                                    </xs:attribute>
                                    <xs:attribute name="maxIntervalWidth" type="xs:duration">
                                        <xs:annotation>
                                            <xs:documentation>The maximum acceptable width of the time
                                                interval parameter of the puzzle.
                                            </xs:documentation>
                                        </xs:annotation>
                                    </xs:attribute>
                                    <xs:attribute name="dateRequired" type="xs:boolean" default="false">
                                        <xs:annotation>
                                            <xs:documentation>Whether a the inclusion of a date parameter is
                                                required (it is always acceptable if present).
                                            </xs:documentation>
                                        </xs:annotation>
                                    </xs:attribute>
                                    <xs:attribute name="subjectRequired" type="xs:boolean"
                                            default="false">
                                        <xs:annotation>
                                            <xs:documentation>Whether a the inclusion of a subject parameter
                                                is required (it is always acceptable if present).
                                            </xs:documentation>
                                        </xs:annotation>
                                    </xs:attribute>
                                    <xs:anyAttribute namespace="##other" processContents="lax"/>
                                </xs:complexType>
                            </xs:element>
                            <xs:any namespace="##other" processContents="lax"/>
                        </xs:choice>
                    </xs:complexType>
                </xs:element>
                <xs:element name="outbound" minOccurs="0">
                    <xs:annotation>
                        <xs:documentation>Policies regarding mail that is sent from the entity.
                        </xs:documentation>
                    </xs:annotation>
                    <xs:complexType>
                        <xs:choice minOccurs="0" maxOccurs="unbounded">
                            <xs:element name="mailServer">
                                <xs:annotation>
                                    <xs:documentation>One group of outbound mail servers. The
                                        usesEnhancedSMTPNoop attribute, if present indicates their known
```

```
                behaviour with respect to that feature.
              </xs:documentation>
            </xs:annotation>
            <xs:complexType>
              <xs:choice minOccurs="0">
                <xs:element name="indirect" type="xs:string">
                  <xs:annotation>
                    <xs:documentation>An indirection to another domain.
                    </xs:documentation>
                  </xs:annotation>
                </xs:element>
                <xs:choice maxOccurs="unbounded">
                  <xs:element name="address" type="xs:string"/>
                  <xs:element name="addressV6" type="xs:string"/>
                  <xs:element name="addressRange" type="xs:string"/>
                </xs:choice>
              </xs:choice>
              <xs:attribute name="usesEnhancedSmtpNoop" type="xs:boolean"
                  use="optional"/>
              <xs:attribute name="allMailIsETPSigned" type="xs:boolean"
                  use="optional"/>
              <xs:anyAttribute namespace="##other" processContents="lax"/>
            </xs:complexType>
          </xs:element>
          <xs:any namespace="##other" processContents="lax"/>
        </xs:choice>
      </xs:complexType>
    </xs:element>
    <xs:element name="otherInfo" minOccurs="0">
      <xs:annotation>
        <xs:documentation>General other information regarding the entity, such as
          certificates that may pertain to it.
        </xs:documentation>
      </xs:annotation>
      <xs:complexType>
        <xs:choice minOccurs="0" maxOccurs="unbounded">
          <xs:element name="x509Certificate" type="xs:base64Binary"/>
          <xs:any namespace="##other" processContents="lax"/>
        </xs:choice>
      </xs:complexType>
    </xs:element>
  </xs:sequence>
  <xs:anyAttribute namespace="##other" processContents="lax"/>
 </xs:complexType>
</xs:element>
<xs:element name="ocspResponse" type="xs:base64Binary">
  <xs:annotation>
    <xs:documentation>Base64 encoding of an RFC2560 OCSPResponse.
    </xs:documentation>
  </xs:annotation>
</xs:element>
</xs:schema>
```

The use of schemas allows a developer to flexibly define (or even re-define) how electronic messaging configuration information is structured without having to redesign applications that process electronic messaging configuration information. TXT records can be utilized to store XML instructions that are constrained by the example XML schema. XML instructions can span a plurality of TXT records in the same DNS record set and can be assembled into an XML instance at a computer system that receives the DNS record set. For example, each TXT record can begin with four characters comprising the four-digit decimal representation (with leading zeros as needed) of a non-negative integer that is unique to the plurality of TXT records. Upon reception, the TXT records are ordered by the decimal number. The first four characters (the decimal numbers) are removed from each TXT record and the results are concatenated together to form a single contiguous sequence of characters (an XML instance).

The following is an example DNS configuration file fragment illustrating an XML policy document for a domain:

```
_emailPolicy TXT ("0002T0H45M0S'/>"
                " <hashedSpam minDifficulty='13'
                      maxIntervalWidth='P0Y0M7DT0H0M0S'"
                " dateRequired='true' subjectRequired='true'/>"
                " </inbound>"
                "</emailPolicy>" )
          TXT ("0001<emailPolicy xmlns='http://lessspam.org/1'>"
```

-continued

```
" <inbound>"
"   <hashedSpam minDifficulty='13' maxIntervalWidth='P0Y0M0D")
```

The example DNS configuration file fragment includes two TXT records, one including the sequence of characters "0002" and another including the sequence of characters "0001". The sequences of characters can be used at a receiving computer system to determine an appropriate order for the XML instructions contained in the TXT records. However, it would be apparent to one skilled in the art, after having reviewed this description, that other order mechanisms can be used and that a DNS configuration file can include additional TXT records. The two text records can be received at a computer system (e.g., in response to a DNS query) and portions of the TXT records can be concatenated into an XML instance. Spanning XML instances across a plurality of TXT records allows increased amounts of electronic messaging configuration information to be conveyed (in excess of 2000 characters). Further, since different portions of XML instances can be included in the same DNS record set, the different portions can be retrieved with a single DNS query.

The example DNS configuration file fragment or other DNS configuration file fragments can be included in a DNS subdomain (e.g., an_emailPolicy subdomain). Thus, it may be that one or more TXT records containing electronic messaging configuration information (e.g., the TXT records of the example DNS configuration file fragment) are all of the records within a particular DNS sub-domain. Accordingly, confusion or conflict with existing uses of TXT records (in other sub-domains) can be reduced.

The following is an example XML instance that can result from concatenating portions of the example DNS configuration file fragment:

computational puzzles. Including portions of XML instances in TXT records also allows new types of electronic messaging information to be added to DNS without client and/or server DNS software having to be updated.

It may that a name server is expressly configured to utilize a protocol that requires sequence numbers when returning electronic messaging configuration information. Thus, any attempts at spoofing the name server would have an additional burden of guessing the sequence numbers used by the name server. For example, a name server can be expressly configured to return electronic messaging configuration information via TCP as opposed to User Datagram Protocol ("UDP"). Thus, any attempts at spoofing the name server would be required to guess an appropriate TCP/IP sequence number used by the name server. In some embodiments, use of a protocol that requires sequence numbers results from the length of the electronic messaging configuration information being returned. For example, when an XML instance is greater than 512 bytes the use of TCP may automatically result.

It may be that an electronic message sender is configured to utilize a plurality of mechanisms for reducing unwanted and unsolicited electronic messages. Thus, the electronic message sender may select one, some, or all of the configured mechanisms when sending an electronic message. Likewise, it may be that an electronic message recipient is configured to utilize a plurality of mechanisms for reducing unwanted and unsolicited electronic messages. Thus, the electronic message recipient may select one, some, or all of the configured mechanisms when sending an electronic message. However,

```
<?xml version="1.0" encoding="UTF-8"?>
<emailPolicy xmlns="http://lessspam.org/1">
   <inbound>
      <hashedSpam minDifficulty="13" maxIntervalWidth="P0Y0M0DT0H45M0S"/>
      <hashedSpam minDifficulty="29" maxIntervalWidth="P0Y0M7DT0H0M0S"
            dateRequired="true" subjectRequired="true"/>
   </inbound>
</emailPolicy>
```

The example XML instance includes an emailPolicy element constrained in accordance with the example XML schema. The example XML instance represents two inbound policies regarding the HashedSpam computational puzzle. The first inbound policy indicates that a puzzle solution with at least 13 zero bits and a time interval parameter less than or equal to 45 minutes in duration is acceptable. The second inbound policy indicates that a puzzle solution with at least 29 zero bits, a time interval parameter less than or equal to a week in duration, and a specified date and subject header is also acceptable.

Portions of the example XML instance, as well as other XML instances, can be included in TXT records at a name server to convey electronic messaging configuration information associated with a domain or electronic messaging server. For example, such XML instances can convey support for altered connection establishment data, authorized outgoing mail servers, reference to ETP certificates, and support for configured mechanisms at an electronic message sender may differ from configured mechanisms at an electronic message sender.

Accordingly, electronic message senders and receivers may agree to mutually configured mechanisms for reducing unwanted and unsolicited electronic messages. Thus, it may be that combinations of results from different configured mechanisms are provided to a message classification module. For example, an electronic message recipient may both check for adherence to an ETP and check for proof of effort by the electronic message sender and provide the results of both checks to a message classification module. Proof of effort can include providing a hash collision, a solution to a cryptographic problem, a solution to a memory bound problem, a solution to a reverse Turing test. A receiving domain can check for provided proof of effort and provide the results of the check to a message classification module.

In this description and in the following claims, a "schema" is defined as an expression of a shared vocabulary between a plurality of computer systems that allows the plurality of computer systems to process documents according to the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems that can also access the XML schema.

Depending on desired functionality, one or more of a plurality of different generated inputs can be provided, potentially along with message data contained in an electronic message, to a message classification module. Based on received inputs, the message classification module can classify an electronic message as legitimate or as unwanted and/or unsolicited. When a plurality inputs (each input representing different information associated with the transmission of an electronic message) are utilized, a message classification module can more reliably classify electronic messages, such as, for example, more reliably classifying an electronic message as unwanted and/or unsolicited.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 8:
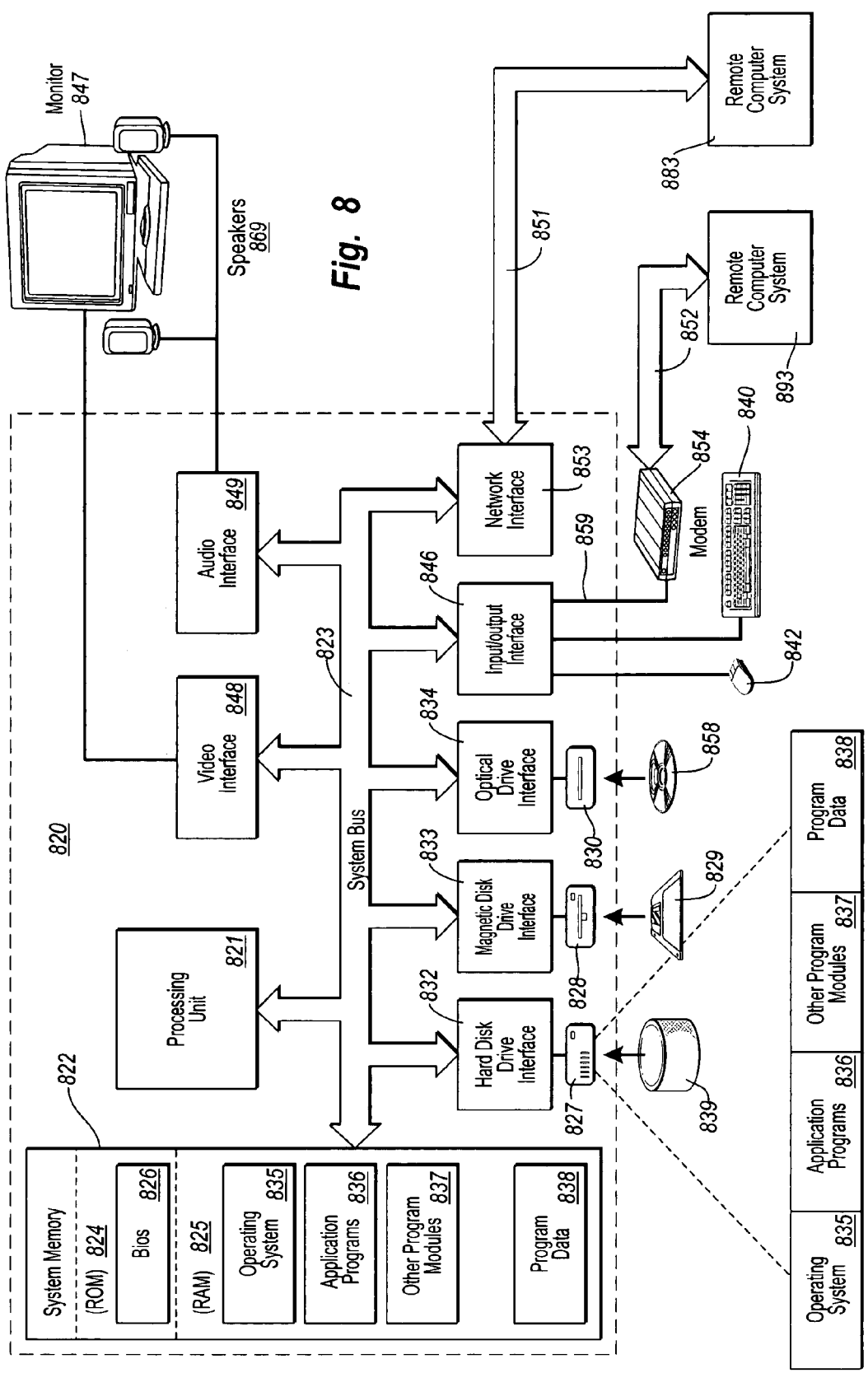
FIG. 8 illustrates a suitable operating environment for the principles of the present invention.

FIG. 8 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 8, an example system for implementing the invention includes a general-purpose computing device in the form of computer system 820, including a processing unit 821, a system memory 822, and a system bus 823 that couples various system components including the system memory 822 to the processing unit 821. Processing unit 821 can execute computer-executable instructions designed to implement features of computer system 820, including features of the present invention. The system bus 823 may be any of several types of bus structures including a memory bus or memory controller, a peripheral bus, and a local bus using any of a variety of bus architectures. The system memory includes read only memory ("ROM") 824 and random access memory ("RAM") 825. A basic input/output system ("BIOS") 826, containing the basic routines that help transfer information between elements within computer system 820, such as during start-up, may be stored in ROM 824.

The computer system 820 may also include magnetic hard disk drive 827 for reading from and writing to magnetic hard disk 839, magnetic disk drive 828 for reading from or writing to removable magnetic disk 829, and optical disk drive 830 for reading from or writing to removable optical disk 831, such as, or example, a CD-ROM or other optical media. The magnetic hard disk drive 827, magnetic disk drive 828, and optical disk drive 830 are connected to the system bus 823 by hard disk drive interface 832, magnetic disk drive-interface 833, and optical drive interface 834, respectively. The drives and their associated computer-readable media provide non-volatile storage of computer-executable instructions, data structures, program modules, and other data for the computer system 820. Although the example environment described herein employs magnetic hard disk 839, removable magnetic disk 829 and removable optical disk 831, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 839, magnetic disk 829, optical disk 831, ROM 824 or RAM 825, including an operating system 835, one or more application programs 836, other program modules 837, and program data 838. A user may enter commands and information into computer system 820 through keyboard 840, pointing device 842, or other input devices (not shown), such as, for example, a microphone, joy stick, game pad, scanner, or the like. These and other input devices can be connected to the processing unit 821 through input/output interface 846 coupled to system bus 823. Input/output interface 846 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 847 or other display device is also connected to system bus 823 via video interface 848. Speakers 869 or other audio output device is also connected to system bus 823 via audio interface 849. Other peripheral output devices (not shown), such as, for example, printers, can also be connected to computer system 820.

Computer system 820 is connectable to networks, such as, for example, an office-wide or enterprise-wide computer network, a home network, an intranet, and/or the Internet. Computer system 820 can exchange data with external sources, such as, for example, remote computer systems, remote applications, and/or remote databases over such networks. For example, computer system 820 can exchange electronic messages with other computer systems connected to a common network with computer system 820.

Computer system 820 includes network interface 853, through which computer system 820 receives data from external sources and/or transmits data to external sources. As depicted in FIG. 8, network interface 853 facilitates the exchange of data with remote computer system 883 via link 851. Network interface 853 can logically represent one or more software and/or hardware modules, such as, for example, a network interface card and corresponding Network Driver Interface Specification ("NDIS") stack. Data link 851 represents a portion of a network (e.g., an Ethernet segment), and remote computer system 883 represents a node of the network. For example, remote computer system 883 can be a querying computer system that sends a DNS query to computer system 820. On the other hand, remote computer system 883 can be a DNS server that sends a DNS answer to computer system 820 in response to a receiving a DNS query.

Likewise, computer system 820 includes input/output interface 846, through which computer system 820 receives data from external sources and/or transmits data to external sources. Input/output interface 846 is coupled to modem 854 (e.g., a standard modem, a cable modem, or digital subscriber line ("DSL") modem) via data link 859, through which computer system 820 receives data from and/or transmits data to external sources. As depicted in FIG. 8, input/output interface 846 and modem 854 facilitate the exchange of data with remote computer system 893 via link 852. Link 852 represents a portion of a network and remote computer system 893 represents a node of the network. For example, remote computer system 893 may be a sending computer system that sends an electronic message to computer system 820. On the other hand, remote computer system 893 may be a receiving computer system that receives an electronic mail message from computer system 820.

While FIG. 8 represents a suitable operating environment for the present invention, the principles of the present invention may be employed in any system that is capable of, with suitable modification if necessary, implementing the principles of the present invention. The environment illustrated in FIG. 8 is illustrative only and by no means represents even a small portion of the wide variety of environments in which the principles of the present invention may be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a sending computer system that is network connectable to one or more receiving computer systems, the sending computer system being configured to send electronic messages to the receiving computer systems, a method for verifying that responses to a connection initiation sent by the sending computer system originate from a designated receiving computer system, the method comprising:

an act of sending connection initiation data to a designated receiving computer system, the connection initiation data including a purported sending address of the sending computer system;

an act of receiving altered connection establishment data that includes address validation data and at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response;

an act of verifying that the connection response was received from the designated receiving computer system based on a determination that the connection response included the address validation data and the portion of non-standard data;

an act of generating an appropriate connection response based on the address validation data and the portion of non-standard data, the response including the portion of non-standard data in a form recognized by the verified receiving computer system as an appropriate form; and an act of sending the appropriate connection response data to the receiving computer system.

2. The method as recited in claim 1, wherein the act of sending connection initiation data to a receiving computer system comprises an act of sending Transmission Control Protocol connection initiation data.

3. The method as recited in claim 1, wherein the act of sending connection initiation data to a receiving computer system comprises an act of sending an SMTP HELO command or SMTP EHLO command.

4. The method as recited in claim 1, wherein the act of receiving altered connection establishment data that includes address validation data comprises an act of receiving altered connection establishment data wherein the altered connection establishment data is selected from among a request to resend connection initiation data and connection establishment data that has been separated into a plurality of network packets.

5. The method as recited in claim 1, wherein the act of receiving altered connection establishment data that includes address validation data comprises an act of receiving an act of receiving a HELO response command or EHLO response command that includes a random sequence of characters.

6. The method as recited in claim 1, wherein the act of generating an appropriate connection response based on the address validation data comprises an act of generating an appropriate connection response wherein the appropriate connection response is selected from among resending the connection initiation data and sending a network packet with an appropriate acknowledgment sequence number.

7. The method as recited in claim 1, wherein the act of generating an appropriate connection response based on the address validation data comprises an act of including a random sequence of characters in an enhanced NOOP command, the random sequence of characters being received from the receiving computer system in response to the connection initiation data.

8. The method as recited in claim 1, wherein the act of sending the appropriate connection response data to the receiving computer system comprises an act of sending an enhanced NOOP command that includes a random sequence of characters, the random sequence of characters being received from the receiving computer system in response to the connection initiation data.

9. In a receiving computer system that is network connectable to one or more sending computer systems, the receiving computer system being configured to receive electronic messages from the sending computer systems, a method for the receiving computer system detecting whether a sending computer system is receiving connection establishment responses, the method comprising:

an act of receiving connection initiation data from a sending computer system, the connection initiation data including a purported sending address of the sending computer system;

an act of altering standard connection establishment data to include address validation data and at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response; and an act of sending the altered connection establishment data to the purported sending address, the sending computer system with the purported sending address being configured to verify that the connection response was received from the receiving computer system based on a determination that the connection response included the address validation data and the portion of non-standard data.

10. The method as recited claim 9, wherein the act of receiving connection initiation data from a sending computer system comprises an act of receiving Transmission Control Protocol connection initiation data.

11. The method as recited claim 9, wherein the act of receiving connection initiation data from a sending computer system comprises an act of receiving an SMTP HELO command or receiving an SMTP EHLO command.

12. The method as recited in claim 9, wherein the act of altering standard connection establishment data to include address validation data comprises an act of altering a standard response to Transmission Control Protocol connection initiation data to request retransmission of the Transmission Control Protocol connection initiation data.

13. The method as recited in claim 9, wherein the act of altering standard connection establishment data to include address validation data comprises an act of separating Transmission Control Protocol connection establishment data into a plurality of network packets.

14. The method as recited in claim 9, wherein the act of altering standard connection establishment data to include address validation data comprises an act of including a random sequence of characters in an SMTP HELO response command or SMTP EHLO response command.

15. The method as recited in claim 9 wherein, the act of sending the altered connection establishment data to the purported sending address comprises an act of sending altered Transmission Control Protocol connection establishment data to a purported Internet Protocol address.

16. The method as recited in claim 9 wherein, the act of sending the altered connection establishment data to the purported sending address comprises an act of sending an SMTP HELO response command or sending an SMTP EHLO response command that includes a random sequence of characters.

17. The method as recited in claim 9, wherein the act of determining if a computer system that corresponds to the purported sending address appropriately responded to the address validation data comprises an act of determining if the purported sending address responded appropriately to altered Transmission Control Protocol connection establishment data.

18. The method as recited in claim 9, wherein the act of determining if a computer system that corresponds to the purported sending address appropriately responded to the address validation data comprises an act of determining if the purported sending address responded appropriately to altered Transmission Control Protocol connection establishment data.

19. The method as recited in claim 9, wherein the act of determining if a computer system that corresponds to the purported sending address appropriately responded to the address validation data comprises an act of determining if the purported sending address responded with an enhanced NOOP command including a random string of characters that was included in the address validation data.

20. The method as recited in claim 9, further comprising:

an act of issuing a DNS query for a DNS record set corresponding to the purported sending address, when the purported sending address does not appropriately respond to the address validation data; and an act of receiving one or more TXT records that include XML instructions indicating whether or not the purported sending address supports the use of address validation data.

21. In a receiving domain that is network connectable to one or more sending domains, the receiving domain including one or more receiving messaging servers configured to receive electronic messages from sending domains, a method for determining if a sending messaging server is authorized to send electronic messages for a sending domain, the method comprising:

an act of receiving an electronic message purportedly sent from the sending domain, the electronic message including at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response;

an act of examining a plurality of parameter values of the electronic message including the portion of non-standard data to attempt to verify that the connection response was received from the designated receiving domain based on a determination that the connection response included the address validation data and the portion of non-standard data;

an act of querying a name server for a list of network addresses authorized to send electronic messages for the sending domain;

an act of determining if the actual sending side network address is authorized to send electronic messages for the sending domain based on the query and on the inclusion of the portion of non-standard data in a form recognized by the verified receiving domain as an appropriate form; and an act of providing results of the determination to an message classification module such that the message classification module can make a more reliable decision as to classifying the received electronic message.

22. The method as recited in claim 21, wherein the act of receiving an electronic message purportedly sent from the sending side domain comprises an act of receiving an electronic mail message.

23. The method as recited in claim 21, wherein an act of receiving an electronic message purportedly sent from the sending domain comprises an act of receiving an electronic message that does not include a Reverse-Path parameter value.

24. The method as recited in claim 21, wherein an act of examining a plurality of parameter values of the electronic message to attempt to identify an actual sending side network address comprises an act of identifying an Internet Protocol address corresponding to the sending computer system.

25. The method as recited in claim 21, wherein an act of examining a plurality of parameter values of the electronic message to attempt to identify an actual sending side network address comprises an act of examining a plurality of parameter values wherein at least one of the plurality of parameter values is selected from among a first Resent-Sender header value, a first mailbox value in the Resent-From header, a Sender header value, or a first mailbox value in the From header.

26. The method as recited in claim 21, wherein the act of querying a name server for a list of network addresses authorized to send electronic messages for the sending domain comprises an act of querying a Domain Name Services server for a list of network addresses authorized to send electronic messages for the sending domain.

27. The method as recited in claim 26, wherein the act of querying a Domain Name Services server for a list of network addresses authorized to send electronic messages for the sending domain comprises the act of querying a Domain Name Services for a list of Internet Protocol addresses authorized to send electronic mail message for the sending domain.

28. The method as recited in claim 21, further comprising:
an act of receiving a list of network addresses that are authorized to send electronic messages for the sending domain.

29. The method as recited in claim 28, wherein an act of receiving a list of network addresses that are authorized to send electronic messages comprises an act of receiving one or more DNS TXT records.

30. The method as recited in claim 29, wherein an act of receiving a list of network addresses that are authorized to send electronic messages comprises an act of receiving one or more DNS TXT records that encode the list of network addresses in XML instructions.

31. The method as recited in claim 30, wherein an act of receiving one or more DNS TXT records that encode the list of network addresses in XML instructions comprises an act of receiving electronic messaging configuration information that spans across a plurality DNS TXT records such that the electronic message configuration information can be concatenated into an XML instance.

32. The method as recited in claim 31, wherein the act of receiving electronic messaging configuration information that spans across a plurality DNS TXT records such that the electronic message configuration information can be concatenated into an XML instance comprises an act of receiving a plurality of DNS TXT records that include ordering data indicating how the XML instructions contained in the DNS TXT records are to be ordered.

33. The method as recited in claim 32, further comprising:
an act of concatenating the XML instructions according to the ordering data to generate an XML instance.

34. The method as recited in claim 21, wherein the act of determining if the actual sending side network address is authorized to send electronic messages for the sending domain comprises an act of determining that the actual sending side network address is contained in a received list of authorized network addresses.

35. The method as recited in claim 21, wherein the act of determining if the actual sending side network address is authorized to send electronic messages for the sending domain comprises an act of determining that the actual sending side network address is not contained in a received list of authorized network addresses.

36. The method as recited in claim 21, wherein the act of an act of providing results of the determination to an message classification module comprises an act of indicating to the message classification module that the actual sending side network address is authorized to send electronic messages for the sending domain.

37. The method as recited in claim 21, wherein the act of an act of providing results of the determination to an message classification module comprises an act of indicating to the message classification module that the actual sending side network address is not authorized to send electronic messages for the sending domain.

38. A computer program product for use in a sending computer system that is network connectable to one or more receiving computer systems, the sending computer system being configured to send electronic messages to the receiving computer systems, the computer program product for implementing a method for verifying that responses to a connection initiation sent by the sending computer system originate from a designated receiving computer system, the computer program product comprising one or more computer-readable media having stored thereon computer executable instructions that, when executed by a processor, cause the sending computer system to perform the following:
send connection initiation data to a designated receiving computer system, the connection initiation data including a purported sending address of the sending computer system;
receive altered connection establishment data that includes address validation data and at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response;
verify that the connection response was received from the designated receiving computer system based on a determination that the connection response included the address validation data and the portion of non-standard data;
generate an appropriate connection response based on the address validation data and the portion of non-standard data, the response including the portion of non-standard data in a form recognized by the verified receiving computer system as an appropriate form; and
send the appropriate connection response data to the receiving computer system.

39. The computer program product as recited in claim 38, wherein computer-executable instructions that, when executed by a processor, cause the sending computer system to receive altered connection establishment data that includes address validation data comprise computer-executable instructions that, when executed by a processor, cause the sending computer system to receive an SMTP HELO command or SMTP EHLO command that includes a random sequence of characters.

40. The computer program product as recited in claim 38, wherein computer-executable instructions that, when executed by a processor, cause the sending computer system to send the appropriate connection response data to the receiving computer system comprise computer-executable instructions that, when executed by a processor, cause the sending computer system to send an enhanced SMTP NOOP command including a random sequence of characters that was included in the received address validation data.

41. A computer program product for use in a receiving computer system that is network connectable to one or more sending computer systems, the receiving computer system being configured to receive electronic messages from the sending computer systems, the computer program product for implementing a method for the receiving computer system detecting whether a sending computer system is receiving connection establishment responses, the computer program product comprising one or more computer-readable media having stored thereon computer executable instructions that, when executed by a processor, cause the receiving computer system to perform the following:

receive connection initiation data from a sending computer system, the connection initiation data including a purported sending address of the sending computer system;

alter standard connection establishment data to include address validation data and at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response; and send the altered connection establishment data to the purported sending address, the sending computer system with the purported sending address being configured to verify that the connection response was received from the receiving computer system based on a determination that the connection response included the address validation data and the portion of non-standard data.

42. The computer program product as recited in claim 41, wherein computer-executable instructions that, when executed by a processor, cause the receiving computer system to alter standard connection establishment data to include address validation data comprises computer-executable instructions that, when executed by a processor, cause the receiving computer system to include a random sequence of characters in an SMTP HELO response command or SMTP EHLO response command.

43. A computer program product for use in a receiving domain that is network connectable to one or more sending domains, the receiving domain including one or more receiving messaging servers configured to receive electronic messages from sending domains, the computer program product for implementing a method for determining if a sending messaging server is authorized to send electronic messages for a sending domain, the computer program product comprising one or more computer-readable media having stored thereon computer executable instructions that, when executed by a processor, cause the receiving domain to perform the following:

receive an electronic message purportedly sent from the sending domain, the electronic message including at least a portion of non-standard data that is not otherwise included in such a connection establishment, such that the inclusion of the portion of non-standard data substantially decreases the likelihood of providing an appropriate connection response without knowing that the portion of non-standard data is to be provided in the connection response;

examine a plurality of parameter values of the electronic message including the portion of non-standard data to attempt to verify that the connection response was received from the designated receiving domain based on a determination that the connection response included the address validation data and the portion of non-standard data;

query a name server for a list of network addresses authorized to send electronic messages for the sending domain;

determine if the actual sending side network address is authorized to send electronic messages for the sending domain based on the query and on the inclusion of the portion of non-standard data in a form recognized by the verified receiving domain as an appropriate form; and provide results of the determination to an message classification module such that the message classification module can make a more reliable decision as to classifying the received electronic message.

44. The computer program product as recited in claim 43, wherein computer executable instructions that, when executed by a processor, cause the receiving domain to examine a plurality of parameter values of the electronic message to attempt to identify an actual sending side network address comprise computer executable instructions that, when executed by a processor, cause the receiving domain to examine a plurality of parameter values wherein at least one of the plurality of parameter values is selected from among a first Resent-Sender header value, a first mailbox value in the Resent-From header, a Sender header value, or a first mailbox value in the From header.

45. The method of claim 1, wherein the sending computer system includes records indicating support for exchange of non-standard connection establishment data in a DNS record set, the DNS record set indicating the electronic mail policy for a domain of the sending computer system.

46. The method of claim 1, wherein the portion of non-standard data includes a random sequence of characters.

47. The method of claim 1, wherein the portion of non-standard data includes regenerated connection initiation data.

48. The method of claim 1, wherein the portion of non-standard data includes an appropriate acknowledgement sequence number.

* * * * *